(12) United States Patent
No et al.

(10) Patent No.: US 11,400,978 B2
(45) Date of Patent: Aug. 2, 2022

(54) VEHICLE CONTROL APPARATUS AND VEHICLE CONTROL METHOD

(71) Applicant: MANDO CORPORATION, Gyeonggi-do (KR)

(72) Inventors: Eun Jung No, Gyeonggi-do (KR); Chang Jun Kim, Gyeonggi-do (KR); Sarang Cha, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 500 days.

(21) Appl. No.: 16/435,431

(22) Filed: Jun. 7, 2019

(65) Prior Publication Data

US 2019/0375455 A1    Dec. 12, 2019

(30) Foreign Application Priority Data

Jun. 8, 2018  (KR) .................. 10-2018-0066292
Jun. 11, 2018 (KR) .................. 10-2018-0066749
Jul. 24, 2018 (KR) .................. 10-2018-0086041

(51) Int. Cl.
*B62D 7/16*    (2006.01)
*B62D 17/00*   (2006.01)

(52) U.S. Cl.
CPC .................... *B62D 17/00* (2013.01)

(58) Field of Classification Search
CPC ............ B60G 17/0162; B60G 7/006; B60G 2202/442; B60G 2202/40; B60G 2200/46; B60G 2204/143

(Continued)

(56) References Cited

U.S. PATENT DOCUMENTS 5,700,025 A  * 12/1997  Lee ................. B60G 3/265
                                            280/124.135
8,200,407 B2 *  6/2012  Horiguchi .......... B62D 6/006
                                            701/80

(Continued)

FOREIGN PATENT DOCUMENTS

DE    10 2012 221 699     7/2013
EP        0 673 798       9/1995

(Continued)

OTHER PUBLICATIONS

Extended European Search Report dated Dec. 2, 2019 for European Patent Application No. 19179188.8.

(Continued)

*Primary Examiner* — Toan C To
(74) *Attorney, Agent, or Firm* — Ladas & Parry, LLP

(57) ABSTRACT

Provided are a vehicle control apparatus and a vehicle control method, a vehicle control apparatus including: a sensor configured to sense at least one of a vehicle speed value and a lateral acceleration value of a vehicle; an active camber device including a knuckle for supporting a wheel of the vehicle, an upper arm having one end rotatably connected to the knuckle to form a stroke node, and a actuator for rotationally shifting the stroke node of the upper arm with respect to a connection point with the knuckle in a vertical direction; and a controller configured to vary a position of the stoke node of the upper arm through the actuator on the basis of one of the sensed vehicle speed value and the sensed lateral acceleration value.

19 Claims, 33 Drawing Sheets

(58) Field of Classification Search
USPC .......................... 280/86.75, 86.751, 124.134
See application file for complete search history.

(56) References Cited

U.S. PATENT DOCUMENTS

| | | | | |
|---|---|---|---|---|
| 8,474,842 | B2* | 7/2013 | Shibuya | B60G 3/20 |
| | | | | 280/93.51 |
| 8,535,206 | B2* | 9/2013 | Kraus | B62K 3/002 |
| | | | | 482/57 |
| 8,651,503 | B2* | 2/2014 | Rhodig | B60G 21/007 |
| | | | | 280/124.103 |
| 8,944,439 | B2* | 2/2015 | Matsuda | B60G 17/0162 |
| | | | | 280/5.521 |
| 11,040,711 | B2* | 6/2021 | Na | B60W 30/02 |
| 2009/0026719 | A1* | 1/2009 | Koch | B60G 21/073 |
| | | | | 280/5.508 |
| 2010/0023214 | A1* | 1/2010 | Horiguchi | B60C 11/0304 |
| | | | | 701/40 |
| 2010/0217491 | A1* | 8/2010 | Naito | B60C 11/00 |
| | | | | 701/49 |
| 2013/0020772 | A1* | 1/2013 | Wolf-Monheim | B60G 3/20 |
| | | | | 280/5.521 |
| 2018/0264905 | A1* | 9/2018 | Kimura | B60G 17/0182 |

FOREIGN PATENT DOCUMENTS

| | | |
|---|---|---|
| JP | 60-193781 | 10/1985 |
| JP | 3-231015 | 10/1991 |
| JP | 5-213027 | 8/1993 |
| JP | 2005-76763 | 3/2005 |
| JP | 2011-105103 | 6/2011 |
| JP | 5062437 | 10/2012 |
| KR | 10-2006-0057317 | 5/2006 |
| KR | 10-0589178 | 6/2006 |
| KR | 10-1673337 | 11/2016 |
| KR | 10-2017-0042742 | 4/2017 |

OTHER PUBLICATIONS

Office Action dated Jul. 16, 2019 for Korean Patent Application No. 10-2018-0066292 and its English machine translation by Google Translate.

* cited by examiner

1800

FIG. 24
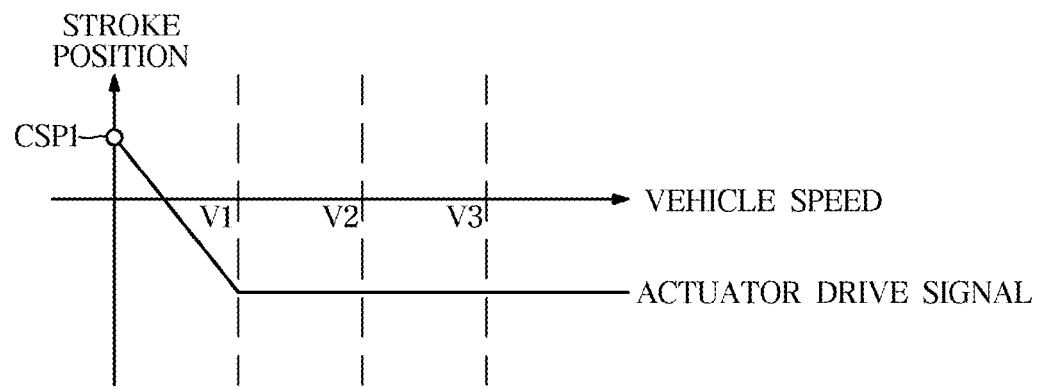
(A) STROKE POSITION STATUS
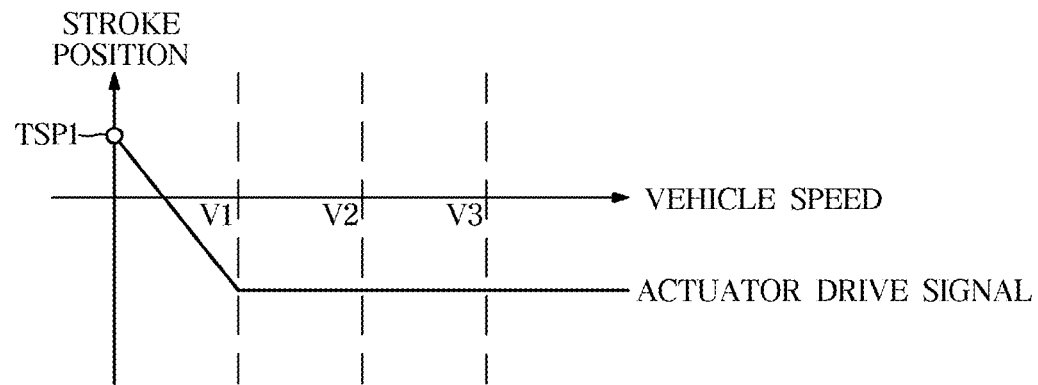
(B) FIRST TARGET STROKE POSITION STATUS FIG. 25
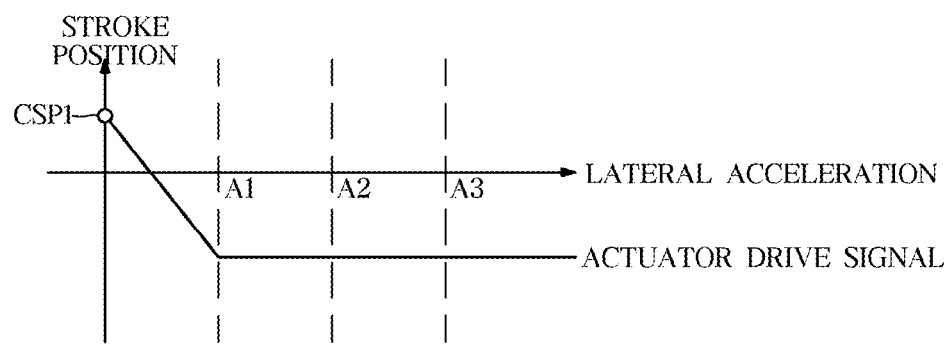
(A) STROKE POSITION STATUS
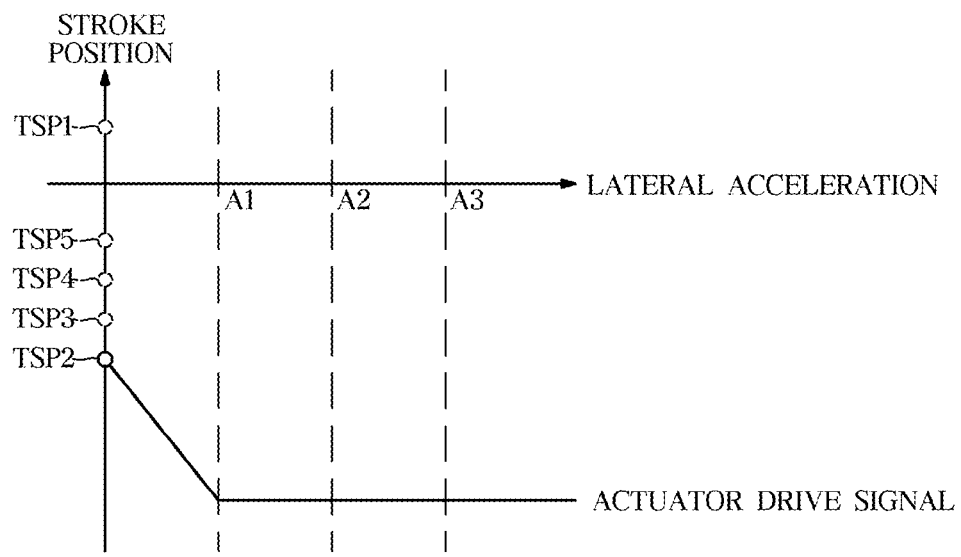
(B) SECOND TARGET STROKE POSITION STATUS FIG. 26
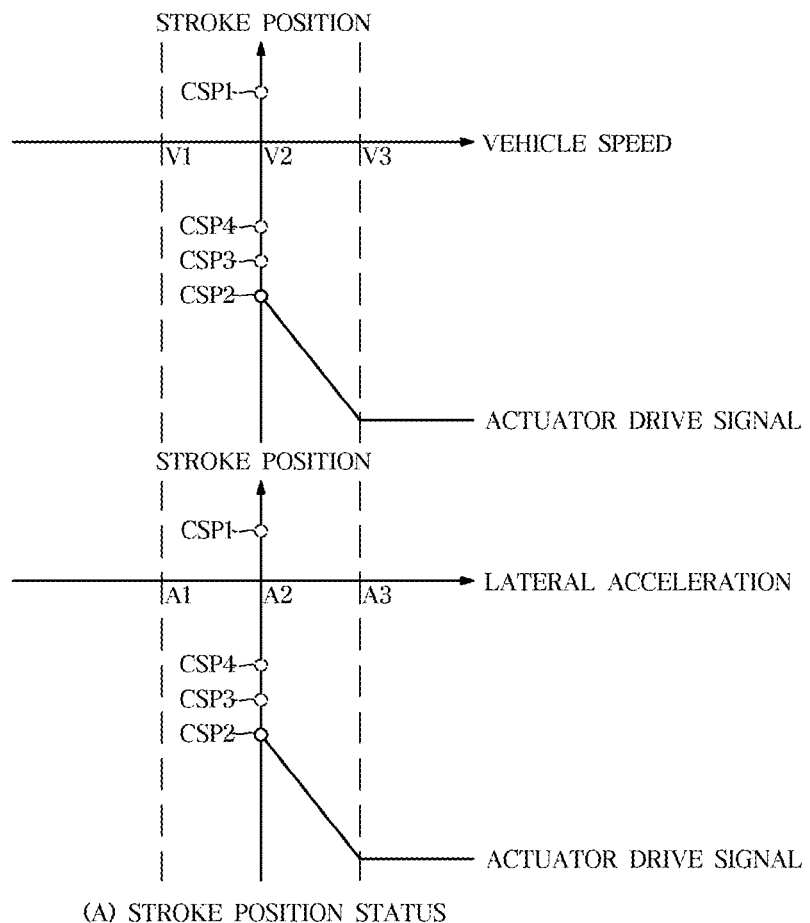
(A) STROKE POSITION STATUS
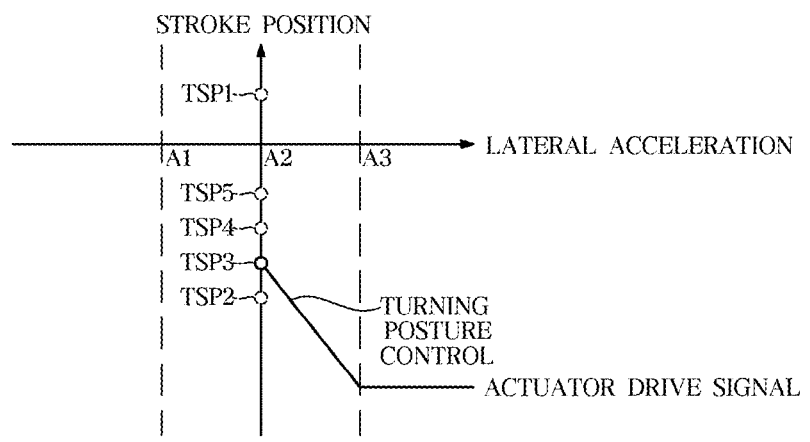
(B) THIRD TARGET STROKE POSITION STATUS FIG. 28
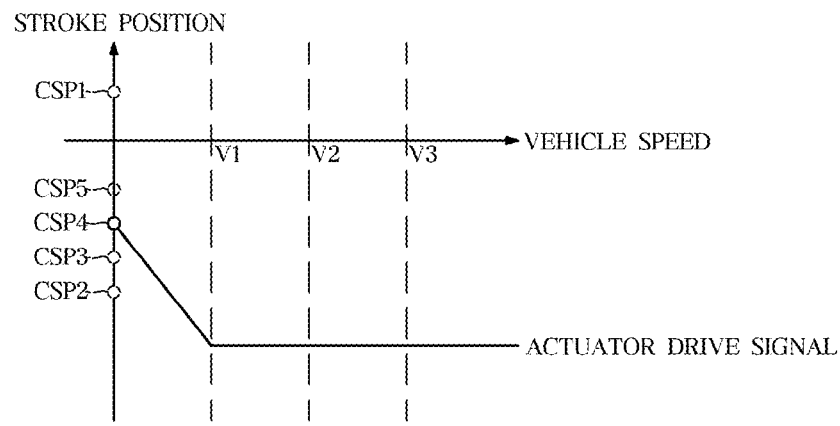
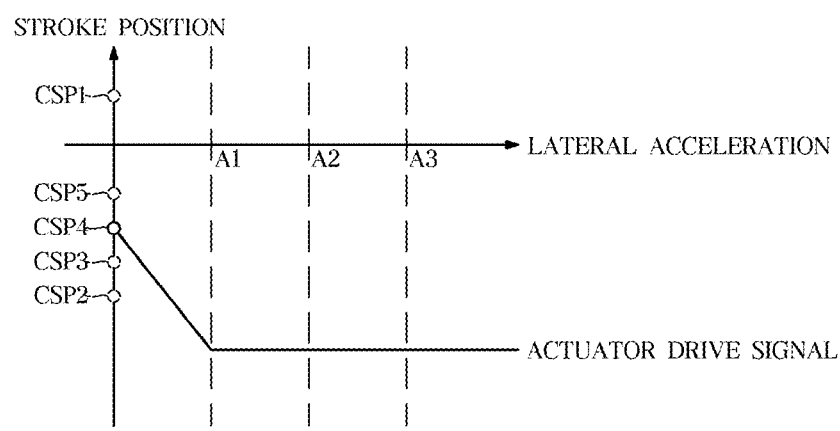
(A) STROKE POSITION STATUS
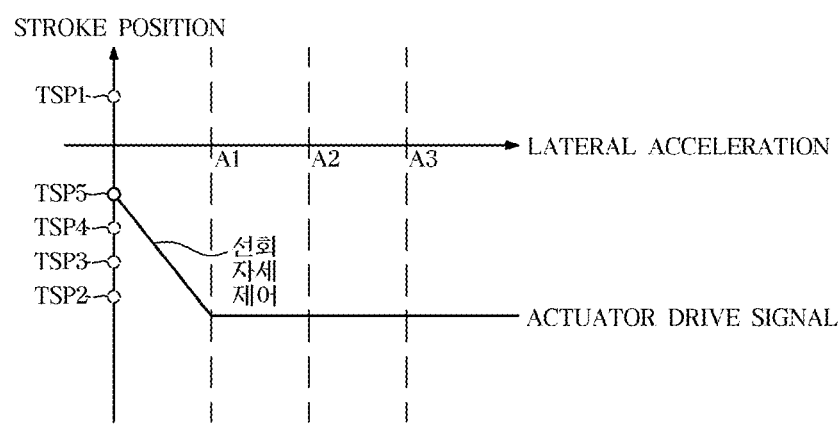
(B) FIFTH TARGET STROKE POSITION STATUS

VEHICLE CONTROL APPARATUS AND VEHICLE CONTROL METHOD

CROSS-REFERENCE TO RELATED APPLICATION

This application is based on and claims priority under 35 U.S.C. § 119 to Korean Patent Applications No. 10-2018-0066292, filed on Jun. 8, 2018, No. 10-2018-0086041, filed on Jul. 24, 2018, and No. 10-2018-0066749, filed on Jun. 11, 2018 in the Korean Intellectual Property Office, the disclosure of which is incorporated herein by reference.

BACKGROUND

1. Field

The present invention relates to a vehicle control apparatus and a vehicle control method.

2. Description of the Related Art

In general, vehicles perform posture control at a time of turning.

An example of the conventional technology is disclosed in Korean Registered Patent No. 10-1673337 (Nov. 1, 2016), relating to an active electric suspension, in which a camber angle at a time of turning of a vehicle is controlled by adjusting the distance between an upper arm and a knuckle using an electric adjuster.

However, there is a limitation in reducing the size of miniaturizing an actuator for adjusting a camber angle of a wheel while improving the performance of adjusting the camber angle at a low power consumption.

In addition, such a conventional active electric suspension has a limitation in providing optimum steering feeling and ride comfort while improving the turning stability of the vehicle.

In addition, such a conventional active electric suspension has a limitation in preventing a tire from being worn out.

RELATED ART DOCUMENT

Patent Document

Korean Registered Patent No. 10-1673337 (Nov. 1, 2016)

SUMMARY

Therefore, it is an object of the present disclosure to provide a vehicle control apparatus and a vehicle control method, capable el of improving the performance of adjusting the camber angle adjusting performance at a low power consumption while reducing the size of miniaturizing the actuator for adjusting the camber angle of the wheel.

It is another object of the present disclosure to provide a vehicle control apparatus and a vehicle control method capable of providing an optimal steering feeling and ride comfort while improving the turning stability of the vehicle.

It is another object of the present disclosure to provide a vehicle control apparatus and a vehicle control method capable of preventing a tire from being worn out.

Additional aspects of the invention will be set forth in part in the description which follows and, in part, will be obvious from the description, or may be learned by practice of the invention.

Therefore, it is an aspect of the present invention to provide a vehicle control apparatus including: sensor configured to sense at least one of a vehicle speed value and a lateral acceleration value of a vehicle; an active camber device including a knuckle for supporting a wheel of the vehicle, an upper arm having one end rotatably connected to the knuckle to form a stroke node, and a actuator for rotationally shifting the stroke node of the upper arm with respect to a connection point with the knuckle in a vertical direction; and a controller configured to vary a position of the stoke node of the upper arm through the actuator on the basis of one of the sensed vehicle speed value and the sensed lateral acceleration value.

The controller may include a manual mode in which the position of the stroke node of the upper arm is adjusted according to a command of a driver or an automatic mode in which the position of the stroke node of the upper arm is automatically adjusted according a steering intention of the driver.

The shift of the stroke node of the upper arm between a plurality of predetermined stroke node positions may be discontinuously performed in the manual mode, and may be continuously performed in the automatic mode.

The controller may determine a stroke node position to which the upper arm is to be shifted, on the basis of the one of the sensed vehicle speed value and the sensed lateral acceleration value.

The controller may shift the stroke node of the upper arm to be closer to a maximum position as the one of the sensed vehicle speed value and the sensed lateral acceleration value increases.

The controller may shift a stroke node of an upper arm positioned on an outer wheel bumped at a time of turning such that a negative camber angle of the outer wheel is increased while shifting a stroke node of an upper arm positioned on an inner wheel rebounded at a time of turning such that a positive camber angle of the inner wheel is increased.

The controller may be further configured to: determine a status of a steering intention of a driver using the sensed vehicle speed value and the sensed lateral acceleration value; and upon determining that the status of the steering intention of the driver, transmit a drive command to the active chamber device such that a stroke position value of the active camber device is shifted to a target stroke position value that is set to correspond to a speed range of the vehicle and a degree of the steering intention of the driver during a turning posture pre-control period in advance, to reduce a turning posture control time in which the active camber device performs a turning posture control corresponding to a turning direction during a turning posture control period.

The controller may be configured to: in response to determining a current state to be a first state in which the vehicle is stopped or travels straight in a low speed range using the sensed vehicle speed value, transmit a first drive command to the active camber device such that the stroke position value of the active camber device is shifted to a first target stroke position value that is set to correspond to the first state during the turning posture pre-control period in advance; in response to determining the current state to be a second state in which the steering intention of the driver is low using the sensed lateral acceleration value, transmit a second drive command to the active camber device such that the stroke position value of the active camber device is shifted to a second target stroke position value that is set to correspond to the second state during the turning posture pre-control period in advance; in response to determining the current state to a third state in which the vehicle travels straight in a high speed range using the sensed vehicle speed value and the sensed lateral acceleration value, transmit a third drive command to the active camber device such that the stroke position value of the active camber device is shifted to a third target stroke position value that is set to correspond to the third state during the turning posture pre-control period in advance; in response to determining the current state to be a fourth state in which the vehicle travels straight in an intermediate speed range using the sensed vehicle speed value and the sensed lateral acceleration value, transmit a fourth drive command to the active camber device such that the stroke position value of the active camber device is shifted to a fourth target stroke position value that is set to correspond to the fourth state during the turning posture pre-control period in advance; and in response to determining the current state to be a fifth state in which the vehicle travels straight in a low speed range using the sensed vehicle speed value and the sensed lateral acceleration value, transmit a fifth drive command to the active camber device such that the stroke position value of the active camber device is shifted to a fifth target stroke position value that is set to correspond to the fifth state during the turning posture pre-control period in advance;

The controller may be further configured to: determine whether the stroke position value is shifted to the corresponding target stroke position value; and in response to determining that the stroke position value is shifted to the corresponding target stroke position value, transmit a control command to the active camber device such that the active camber device performs a turning posture control corresponding to a turning direction during the turning posture control period.

The controller may be configured to: in response to determining that the stroke position value is shifted to the third target stroke position value that is set to correspond to the third state in which the vehicle travels straight in the high speed range, transmit a first control command to the active camber device such that the active camber device performs a turning posture control corresponding to a turning direction during the turning posture control period; in response to determining that the stroke position value is shifted to the fourth target stroke position value that is set to correspond to the fourth state in which the vehicle travels straight in the intermediate speed range, transmit a second control command to the active camber device such that the active camber device performs a turning posture control corresponding to a turning direction during the turning posture control period; and in response to determining that the stroke position value is shifted to the fifth target stroke position value that is set to correspond to the fifth state in which the vehicle travels straight in the low speed range, transmit a third control command to the active camber device such that the active camber device performs a turning posture control corresponding to a turning direction during the turning posture control period.

It is another aspect of the present invention to provide a vehicle control method including: sensing at least one of a vehicle speed value and a lateral acceleration value of a vehicle; and varying a position of a stoke node of an upper arm through an actuator of an active camber device on the basis of one of the sensed vehicle speed value and the sensed lateral acceleration value.

The vehicle control method may further include performing a manual mode in which the position of the stroke node of the upper arm is adjusted according to a command of a driver, or an automatic mode in which the position of the stroke node of the upper arm is automatically adjusted according a steering intention of the driver.

The vehicle control method may further include determining a stroke node position to which the upper arm is to be shifted, on the basis of the one of the sensed vehicle speed value and the sensed lateral acceleration value.

The vehicle control method may further include shifting the stroke node of the upper arm to be closer to a maximum position as the one of the sensed vehicle speed value and the sensed lateral acceleration value increases.

The vehicle control method may further include shifting a stroke node of an upper arm positioned on an outer wheel bumped at a time of turning such that a negative camber angle of the outer wheel is increased while shifting a stroke node of an upper arm positioned on an inner wheel rebounded at a time of turning such that a positive camber angle of the inner wheel is increased.

The vehicle control method may further include: determining a status of a steering intention of a driver using the sensed vehicle speed value and the sensed lateral acceleration value, and upon determining that the status of the steering intention of the driver, transmitting a drive command to the active chamber device such that a stroke position value of the active camber device is shifted to a target stroke position value that is set to correspond to a speed range of the vehicle and a degree of the steering intention of the driver during a turning posture pre-control period in advance, to reduce a turning posture control time in which the active camber device performs a turning posture control corresponding to a turning direction during a turning posture control period.

The vehicle control method may further include: in response to determining a current state to be a first state in which the vehicle is stopped or travels straight in a low speed range using the sensed vehicle speed value, transmitting a first drive command to the active camber device such that the stroke position value of the active camber device is shifted to a first target stroke position value that is set to correspond to the first state during the turning posture pre-control period in advance; in response to determining the current state to be a second state in which the steering intention of the driver is low using the sensed lateral acceleration value, transmitting a second drive command to the active camber device such that the stroke position value of the active camber device is shifted to a second target stroke position value that is set to correspond to the second state during the turning posture pre-control period in advance; in response to determining the current state to a third state in which the vehicle travels straight in a high speed range using the sensed vehicle speed value and the sensed lateral acceleration value, transmitting a third drive command to the active camber device such that the stroke position value of the active camber device is shifted to a third target stroke position value that is set to correspond to the third state during the turning posture pre-control period in advance; in response to determining the current state to be a fourth state in which the vehicle travels straight in an intermediate speed range using the sensed vehicle speed value and the sensed lateral acceleration value, transmitting a fourth drive command to the active camber device such that the stroke position value of the active camber device is shifted to a fourth target stroke position value that is set to correspond to the fourth state during the turning posture pre-control period in advance; and in response to determining the current state to be a fifth state in which the vehicle travels straight in a low speed range using the sensed vehicle speed value and the sensed lateral acceleration value, transmitting a fifth drive command to the active camber device such that the stroke position value of the active camber device is shifted to a fifth target stroke position value that is set to correspond to the fifth state during the turning posture pre-control period in advance;

The vehicle control method may further include: determining whether the stroke position value is shifted to the corresponding target stroke position value; and in response to determining that the stroke position value is shifted to the corresponding target stroke position value, transmitting a control command to the active camber device such that the active camber device performs a turning posture control corresponding to a turning direction during the turning posture control period.

The vehicle control method may further include: in response to determining that the stroke position value is shifted to the third target stroke position value that is set to correspond to the third state in which the vehicle travels straight in the high speed range, transmitting a first control command to the active camber device such that the active camber device performs a turning posture control corresponding to a turning direction during the turning posture control period; in response to determining that the stroke position value is shifted to the fourth target stroke position value that is set to correspond to the fourth state in which in which the vehicle travels straight in the intermediate speed range, transmitting a second control command to the active camber device such that the active camber device performs a turning posture control corresponding to a turning direction during the turning posture control period; and in response to determining that the stroke position value is shifted to the fifth target stroke position value that is set to correspond to the fifth state in which the vehicle travels straight in the low speed range, transmitting a third control command to the active camber device such that the active camber device performs a turning posture control corresponding to a turning direction during the turning posture control period

BRIEF DESCRIPTION OF THE DRAWINGS

These and/or other aspects of the invention will become apparent and more readily appreciated from the following description of the embodiments, taken in conjunction with the accompanying drawings of which:

FIG. 24 is a graph showing an example in which a controller shown in FIG. 1 transmits a first drive command to the active camber device such that a stroke position value is shifted to a first target stroke position value in advance.

FIG. 25 is a graph showing an example in which a controller shown in FIG. 1 transmits a second drive command to the active camber device such that a stroke position value is shifted to a second target stroke position value in advance.

FIG. 26 is a graph showing an example in which a controller shown in FIG. 1 transmits a third drive command to the active camber device such that a stroke position value is shifted to a third target stroke position value in advance.

FIG. 28 is a graph showing an example in which a controller shown in FIG. 1 transmits a fifth drive command to the active camber device such that a stroke position value is shifted to a fifth target stroke position value in advance.

DETAILED DESCRIPTION

Hereinafter, embodiments of the present invention will be described in detail with reference to the accompanying drawings. The following embodiments are provided to fully convey the spirit of the present invention to a person having ordinary skill in the art to which the present invention belongs. The present invention is not limited to the embodiments shown herein but may be embodied in other forms. In order to make the description of the present invention clear, unrelated parts are not shown and, the sizes of components are exaggerated for clarity.

Figure 1:
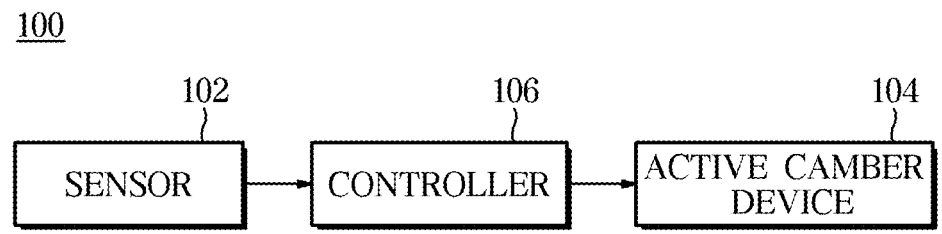
FIG. 1 is a block diagram illustrating an example of a vehicle control apparatus according to an embodiment of the present invention.
Figure 2:
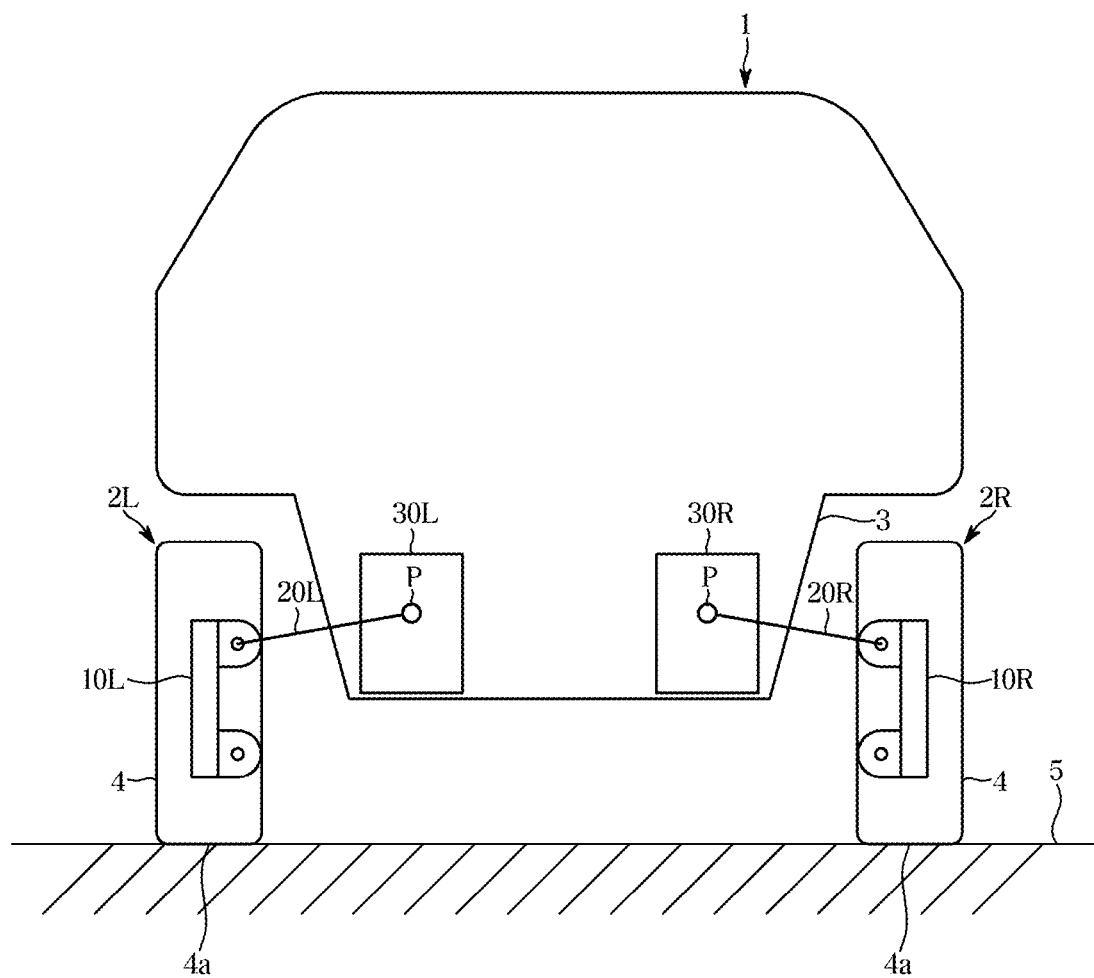
FIG. 2 is a view illustrating an example of an active camber device shown in FIG. 1.

FIG. 1 is a block diagram illustrating an example of a vehicle control apparatus according to an embodiment of the present invention, and FIG. 2 is a view illustrating an example of an active camber device shown in FIG. 1.

Figure 3:
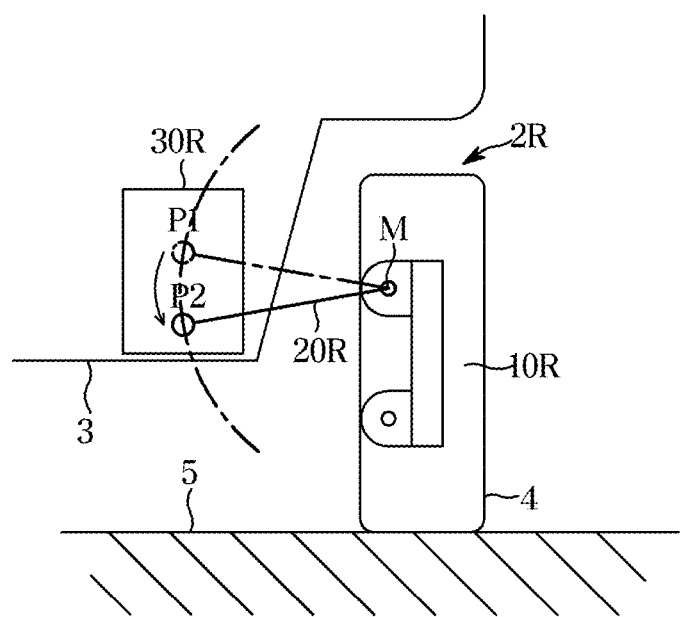
FIG. 3 is a view illustrating an example of a stroke node position being varied by an active camber device shown in FIG. 2.
Figure 4:
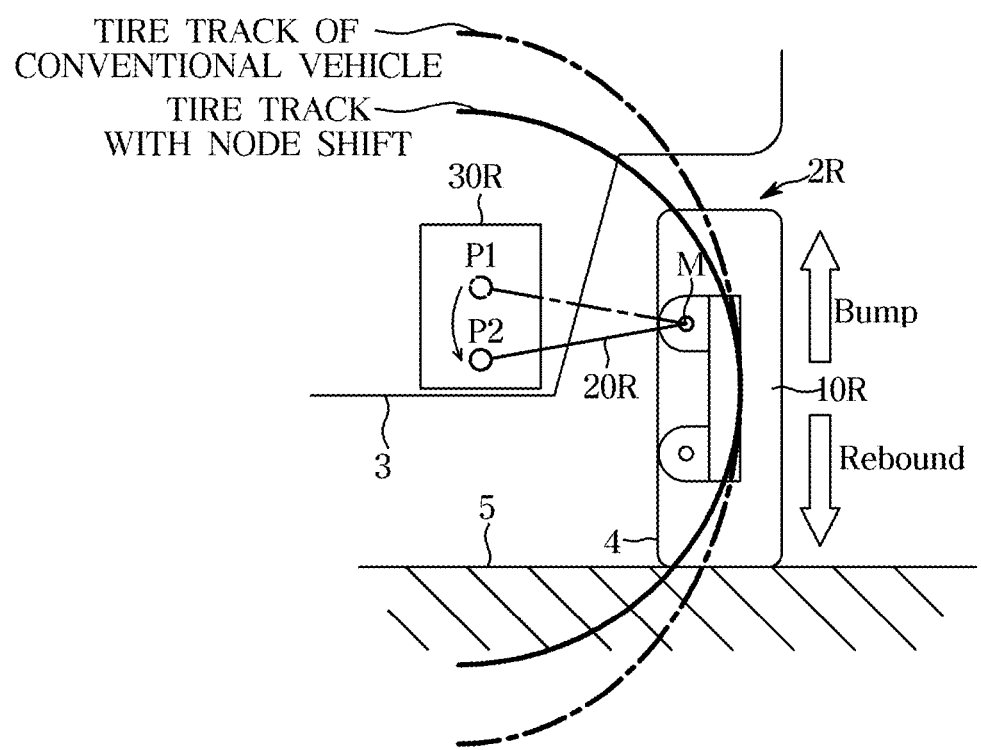
FIG. 4 is a view illustrating comparison between a tire track according to a conventional vehicle and a tire track having a stroke node position varied by the active camber device shown in FIG. 3.

FIG. 3 is a view illustrating an example of a stroke node position being varied by an active camber device shown in FIG. 2, and FIG. 4 is a view illustrating comparison between a tire track according to a conventional vehicle and a tire track having a stroke node position varied by the active camber device shown in FIG. 3.

Figure 5:
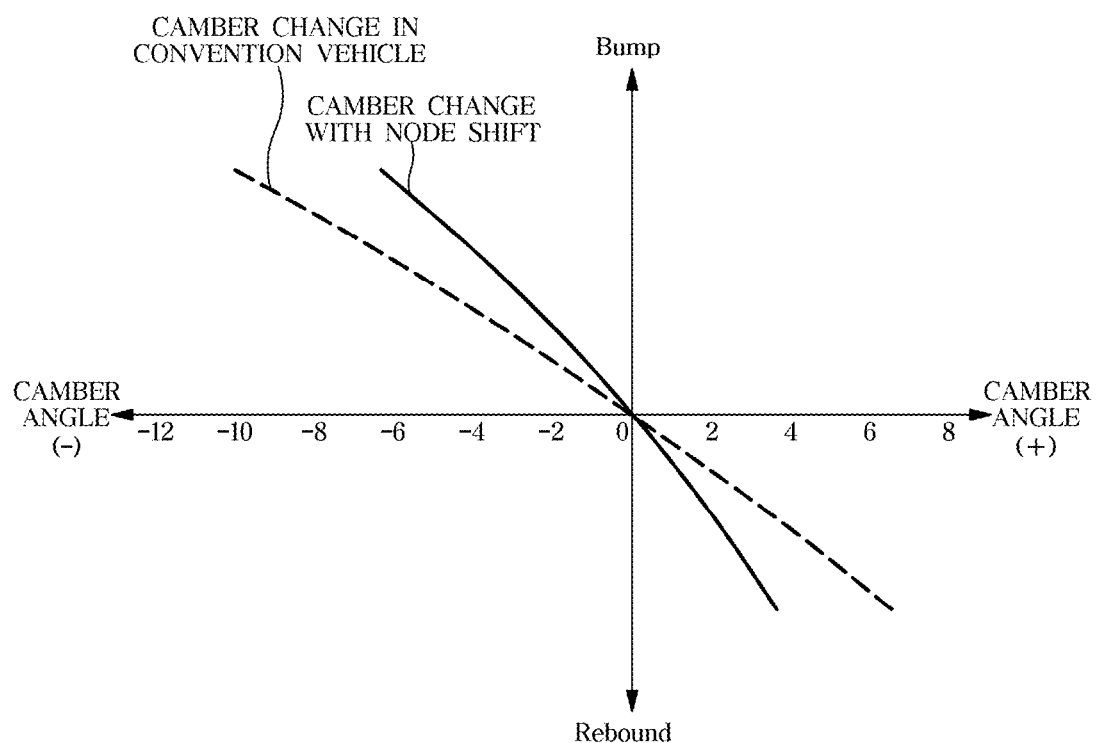
FIG. 5 is a view illustrating comparison between a change in camber according to the conventional technology and a change in camber having a stroke node position varied by the active camber device shown in FIG. 4 at a time of a bump and a rebound.

FIG. 5 is a view illustrating comparison between a change in camber according to the conventional technology and a change in camber having a stroke node position varied by the active camber device shown in FIG. 4 at a time of a bump and a rebound.

FIGS. 6 to 11 are views illustrating an example of a stroke node position being varied on the basis of a vehicle speed value by the active camber device shown in FIG. 2, and FIGS. 12 to 17 are views illustrating an example of a stroke node position being varied on the basis of a lateral acceleration value by the active camber device shown in FIG. 2.

Referring to FIGS. 1 to 17, a vehicle control apparatus 100 according to an embodiment of the present invention includes a sensor 102, an active camber device 104, and a controller 108.

The sensor 102 senses a vehicle speed value, and the active camber device 104 includes knuckles 10L and 10R, upper arms 20L and 20R, and actuators 30L and 30R.

The left knuckle 10L supports a left wheel 2L of a vehicle 1 and the right knuckle 10R supports a right wheel 2R of the vehicle 1.

In this case, the left wheel 2L may represent a left rear wheel or a left front wheel.

In addition, the right wheel 2R may represent a right rear wheel or a right front wheel.

The left upper arm 20L connects the left knuckle 10L to a vehicle body 3 and has one end thereof pivotably connected to the left knuckle 10L to form a stroke node P.

The right upper arm 20R connects the right knuckle 10R to the vehicle body 3 and has one end thereof pivotably connected to the right knuckle 10R to form a stroke node P.

The left wheel 2L and the right wheel 2R each have a tire 4 mounted thereon, and the tire 4 has an outer circumferential surface 4a making contact with a ground surface 5.

Referring to FIG. 3, the right actuator 30R rotates a stroke node of the right upper arm 20R with respect to a connection point M with the right knuckle 10R in a vertical direction from P1 to P2.

Referring to FIG. 4, when the stroke node of the right upper arm 20R is at P1, a tire at a time of a bump or rebound has the same track as that of the conventional vehicle, as shown in a dotted line.

When the stroke node of the right upper arm 20R is rotationally shifted from P1 to P2, a tire at a time of a bump or rebound has a track as shown in a solid line, which has a turning radius smaller than that of the conventional vehicle.

In this case, referring to FIGS. 4 and 5, when the stroke node of the right upper arm 20R is rotationally shifted from P1 to P2, a negative camber angle at a time of a bump increases, and thus the negative camber characteristic may be improved at a lower power consumption than with the conventional vehicle.

In addition, when the stroke node of the right upper arm 20R is rotationally shifted from P1 to P2, a positive camber angle at a time of a rebound increases, and thus the positive camber characteristic may be improved at a lower power consumption than with the conventional vehicle.

Although not shown, the left actuator 30L may also have a stroke node rotationally shifted with respect to a connection point (not shown) with the left knuckle 10L in a vertical direction from P1 to P2 in the similar way as the right actuator 30R.

Although not shown, when the stroke node of the left upper arm 20L is rotationally shifted from P1 to P2, a negative camber angle at a time of a bump increases, and thus the negative camber characteristic may be improved at a lower power consumption than with the conventional vehicle, and when the stroke node of the left upper arm 20L is rotationally shifted from P1 to P2, a positive camber angle at a time of a rebound increases, and thus the positive camber characteristic may be improved at a lower power consumption than with the conventional vehicle.

Although not shown, the left upper arm 20L or the right upper arm 20R may be shifted for at least three stroke nodes, such as P1, P2, and P3.

Referring to FIGS. 1, 2 and FIGS. 6 to 11, the controller 106 varies the stroke node position of the upper arm 20L or 20R (from SP1 to SP2) through the actuators 30L and 30R on the basis of a vehicle speed value sensed by the sensor 102

Referring to FIGS. 1, 2 and FIGS. 12 to 17, the controller 106 may vary the stroke node position of the upper arm 20L or 20R (from SP1 to SP2) through the actuator 30L or 30R on the basis of a lateral acceleration value sensed by the sensor 102.

Although not shown, the controller 106 may include a manual mode in which the stroke node position of the upper arm 20L or 20R is manually adjusted according to a command of a driver.

The controller 106 may include an automatic mode in which the stroke node position of the upper arm 20L or 20R is automatically adjusted according to a steering intention of the driver.

In this case, the stroke node shift of the upper arm 20L or 20R between a plurality of predetermined stroke node positions may be performed discontinuously in the manual mode, and may be continuously performed in the automatic mode.

For example, the stroke node shift of the upper arms 20L or 20R may be discontinuously performed for respective positions 0 mm, −30 mm, −40 mm, and the like, in the manual mode, and may be continuously performed from a position 10 mm to a position −40 mm in the automatic mode.

Referring to FIGS. 1 and 2, and FIGS. 6 to 11, the controller 106 determines a stroke node position from SP1 to SP2 to which the upper arm 20 L or 20R is to be moved on the basis of the vehicle speed value sensed by the sensor 102.

Here, the controller 106 may shift the stroke node of the upper arm 20L or 20R from an initial position SP1 to a maximum position SP2 according to the vehicle speed value sensed by the sensor 102.

In this case, the controller 106 may shift the stroke node of the upper arm 20L or 20R to be closer to the maximum position SP2 as the vehicle speed value sensed by the sensor 102 increases.

Figure 6:
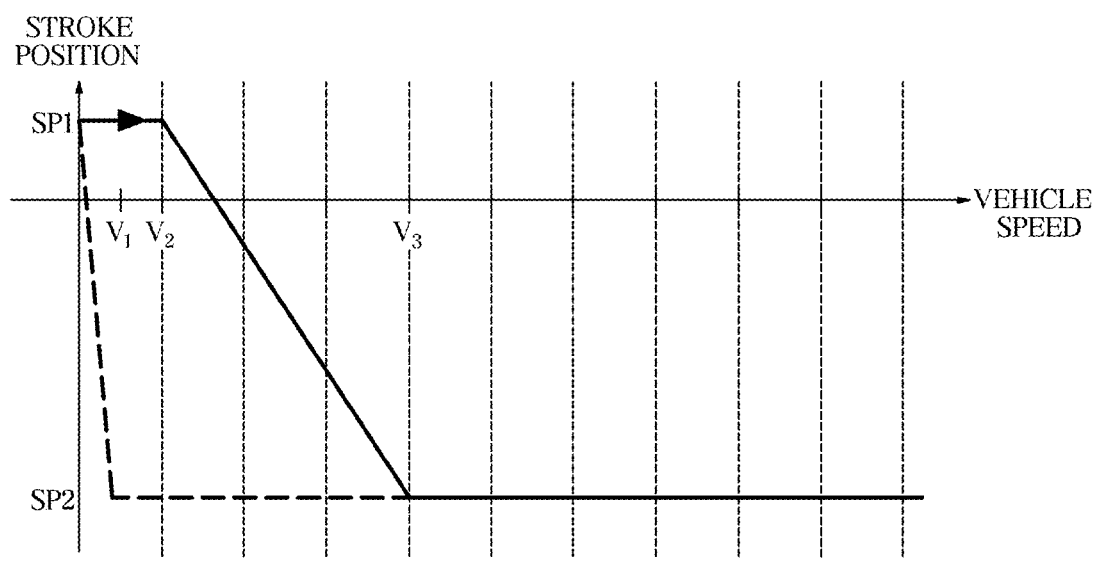
FIGS. 6 to 11 are views illustrating an example of a stroke node position being varied on the basis of a vehicle speed value by the active camber device shown in FIG. 2.

In detail, referring to FIGS. 1, 2 and 6, the controller 106, upon determining that the vehicle speed value sensed by the sensor 102 is in a first range from 0 to V2, may maintain the stroke node of the upper arm 20L or 20R at the initial position SP1.

In this case, the initial position SP1 may be a position of 10 mm.

Figure 7:
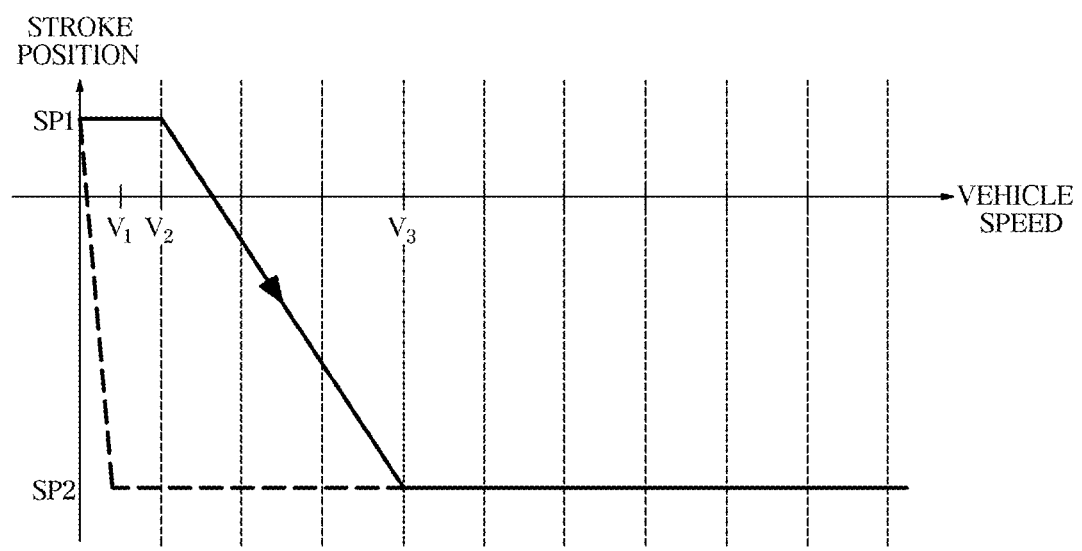

Referring to FIGS. 1, 2, and 7, the controller 106, upon determining that the vehicle speed value sensed by the sensor 102 is at an outside of the first range 0 to V2, may shift the stroke node of the upper arm 20L or 20R to a stroke node position from SP1 to SP2 according to the sensed vehicle speed value such that the stroke node position is linearly increased as the sensed vehicle speed value increases.

In this case, the stroke node position SP1 to SP2 corresponding to the sensed vehicle speed value may be in a range of 10 mm to −40 mm.

Figure 8:
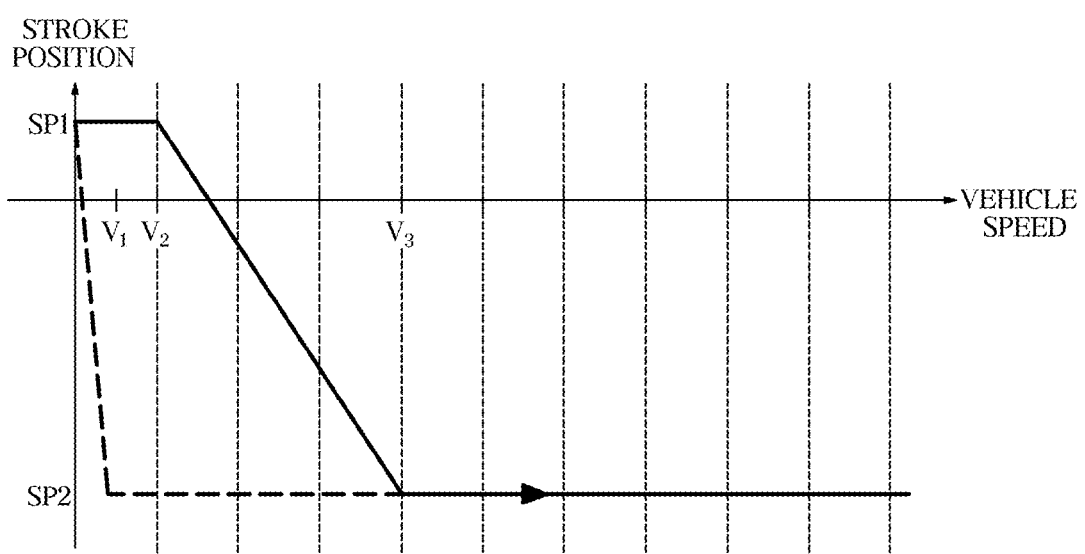

Referring to FIGS. 1, 2 and 8, the controller 106, upon determining that the vehicle speed value sensed by the sensor 102 is higher than a preset maximum value V3, may shift the stork node of the upper arm 20L or 20R to the maximum position SP2.

In this case, the maximum position SP2 may be a position of −40 mm.

In addition, referring to FIGS. 1 and 2 and FIGS. 9 to 11, the controller 106, upon determining that the vehicle speed value sensed by the sensor 102 is decreasing to be lower than a preset minimum value V1 for a preset period of time t, may shift the stroke node of the upper arm 20L or 20R to the initial position SP1.

In this case, the initial position SP1 may be a position of 10 mm.

Referring to FIGS. 1 to 4, the controller 106 may shift the stroke node of the upper arm 20R located on the right wheel 2R, which may serve as an outer wheel and be bumped at a time of turning, such that that the negative camber angle of the outer wheel 2R is increased while shifting the stroke node of the upper arm 20L located on the left wheel 2L, which may serve as an inner wheel and be rebounded at a time of turning, such that the positive camber angle of the inner wheel 2L is increased.

In addition, although not shown, the controller 106 may shift the stroke node of the upper arm 20L located on the left wheel 2L, which may serve as an outer wheel and be bumped at a time of turning, such that that the negative camber angle of the outer wheel 2L is increased while shifting the stroke node of the upper arm 20R located on the right wheel 2R, which may serve as an inner wheel and be rebounded at a time of turning, such that the positive camber angle of the inner wheel 2R is increased.

Referring to FIGS. 1 and 2 and FIGS. 12 to 17, the controller 106 may determine the stroke node positions from SP1 to SP2 to which the upper arms 20L and 20R are to be moved on the basis of the sensed lateral acceleration values.

Here, the controller 106 may shift the stroke node of the upper arm 20L or 20R from an initial position SP1 to a maximum position SP2 according to the sensed lateral acceleration value.

In this case, the controller 106 may shift the stroke node of the upper arm 20L or 20R to be closer to the maximum position SP2 as the sensed lateral acceleration value increases.

Figure 12:
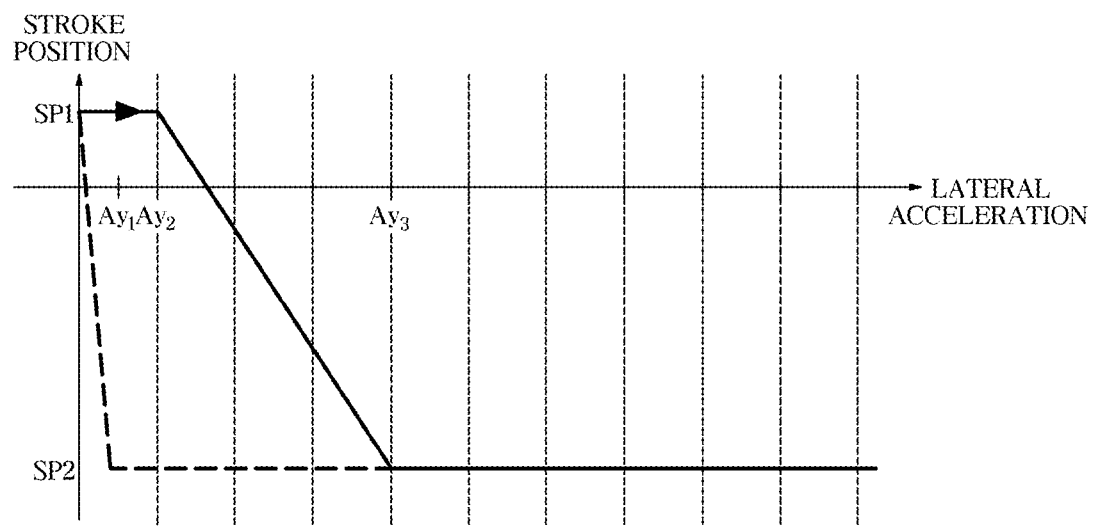
FIGS. 12 to 17 are views illustrating an example of a stroke node position being varied on the basis of a lateral acceleration value by the active camber device shown in FIG. 2.

In detail, referring to FIGS. 1, 2 and 12, the controller 106, upon determining that the sensed lateral acceleration value is in a first range from 0 to AY2, may maintain the stroke node of the upper arm 20L or 20R at the initial position SP1.

In this case, the initial position SP1 may be a position of 10 mm.

Figure 13:
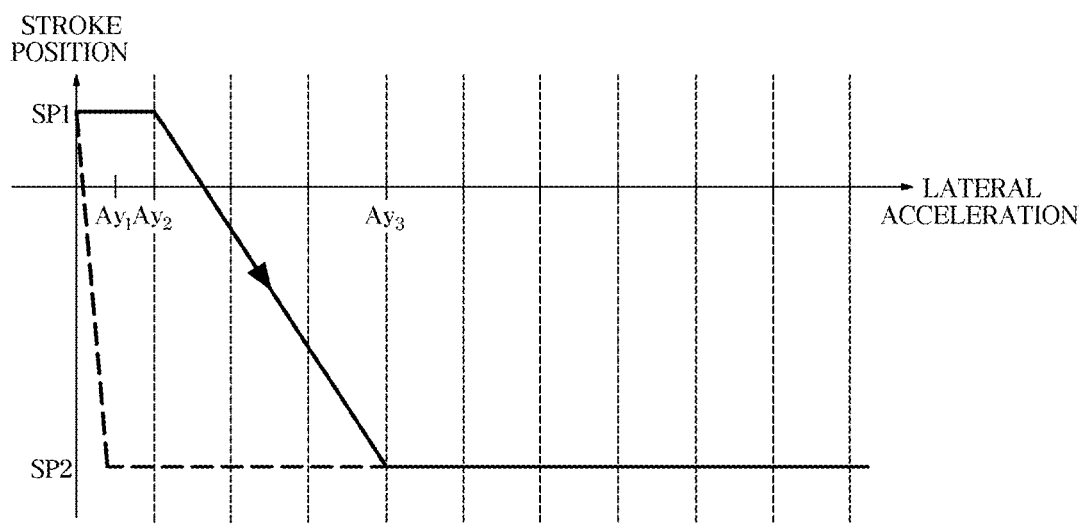

Referring to FIGS. 1, 2, and 13, the controller 106, upon determining that the sensed lateral acceleration value is at an outside of the first range 0 to AY2, may shift the stroke node of the upper arm 20L or 20R to a stroke node position from SP1 to SP2 according to the sensed lateral acceleration value such that the stroke node position is linearly increased as the sensed lateral acceleration value increases.

In this case, the stroke node position SP1 to SP2 corresponding to the sensed lateral acceleration value may be in a range of 10 mm to −40 mm.

Figure 14:
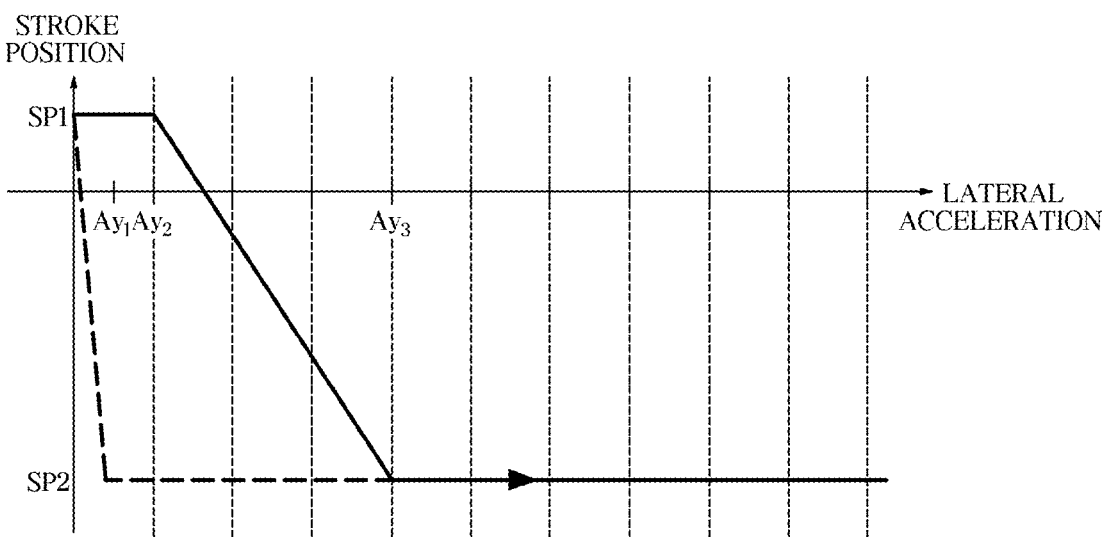

Referring to FIGS. 1, 2 and 14, the controller 106, upon determining that the sensed lateral acceleration value is higher than a preset maximum value AY3, may shift the stork node of the upper arm 20L or 20R to the maximum position SP2.

In this case, the maximum position SP2 may be a position of −40 mm.

In addition, referring to FIGS. 1 and 2 and FIGS. 15 to 17, the controller 106, upon determining that the sensed lateral acceleration value is decreasing to be lower than a preset minimum value AY1 for a preset period of time t, may shift the stroke node of the upper arm 20L or 20R to the initial position SP1.

In this case, the initial position SP1 may be a position of 10 mm.

Referring to FIGS. 1 to 4, the controller 106 may shift the stroke node of the upper arm 20R located on the right wheel 2R, which may serve as an outer wheel and be bumped at a time of turning, such that that the negative camber angle of the outer wheel 2R is increased while shifting the stroke node of the upper arm 20L located on the left wheel 2L, which may serve as an inner wheel and be rebounded at a time of turning, such that the positive camber angle of the inner wheel 2L is increased.

In addition, although not shown, the controller 106 may shift the stroke node of the upper arm 20L located on the left wheel 2L, which may serve as an outer wheel and be bumped at a time of turning, such that that the negative camber angle of the outer wheel 2L is increased while shifting the stroke node of the upper arm 20R located on the right wheel 2R, which may serve as an inner wheel and be rebounded at a time of turning, such that the positive camber angle of the inner wheel 2R is increased.

Figure 18:
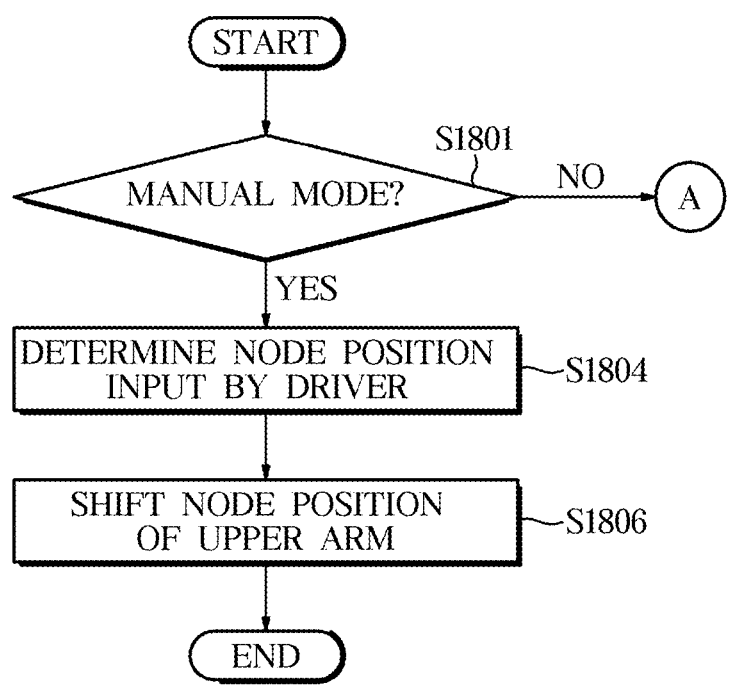
FIG. 18 is a flowchart showing a vehicle control method of a vehicle control apparatus according to an embodiment of the present invention, which illustrates an example of changing a stroke node position of an upper arm in a manual mode.

FIG. 18 is a flowchart showing a vehicle control method of a vehicle control apparatus according to an embodiment of the present invention, which illustrates an example of changing a stroke node position of an upper arm in a manual mode.

Figure 19:
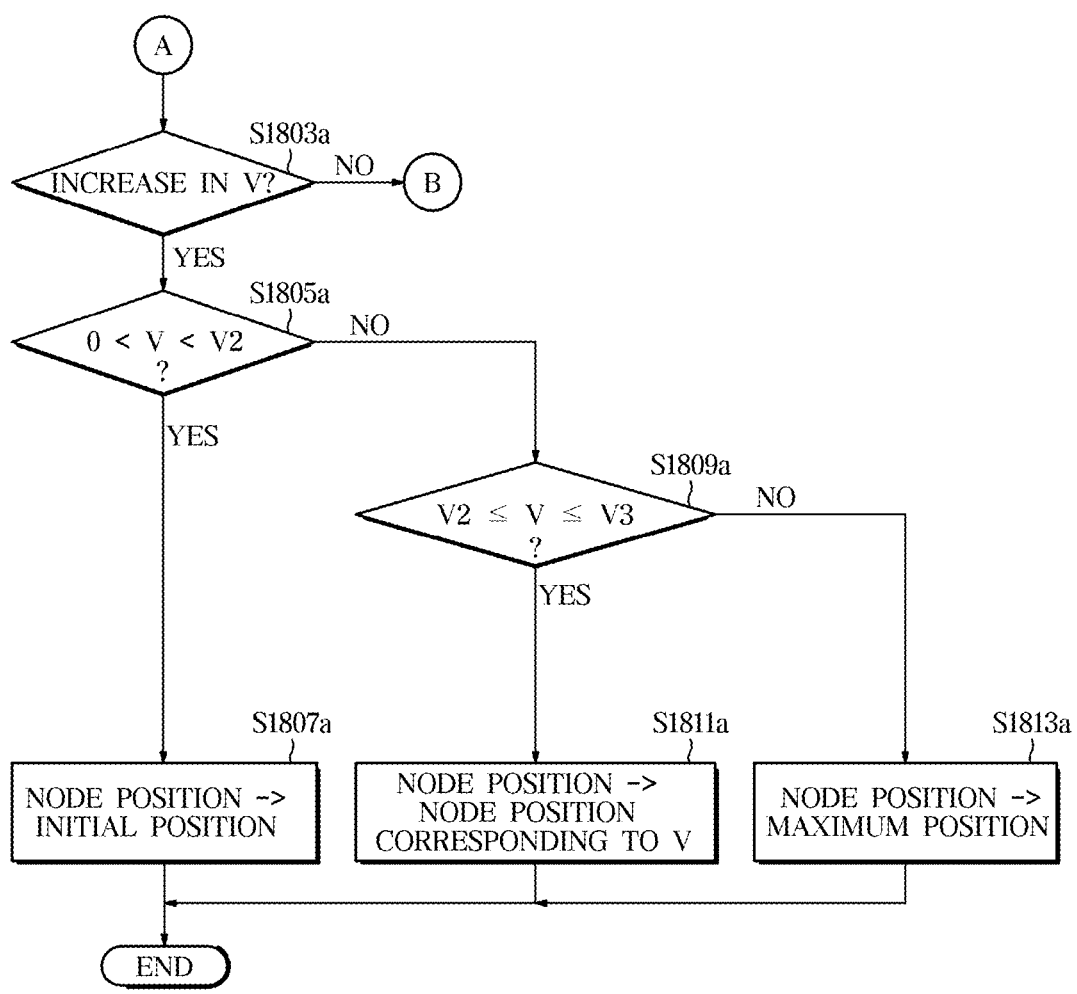
FIGS. 19 and 20 are flowchart showing a vehicle control method of a vehicle control apparatus according to an embodiment of the present invention, which illustrates an example of changing a stroke node position of an upper arm in an automatic mode.
Figure 20:
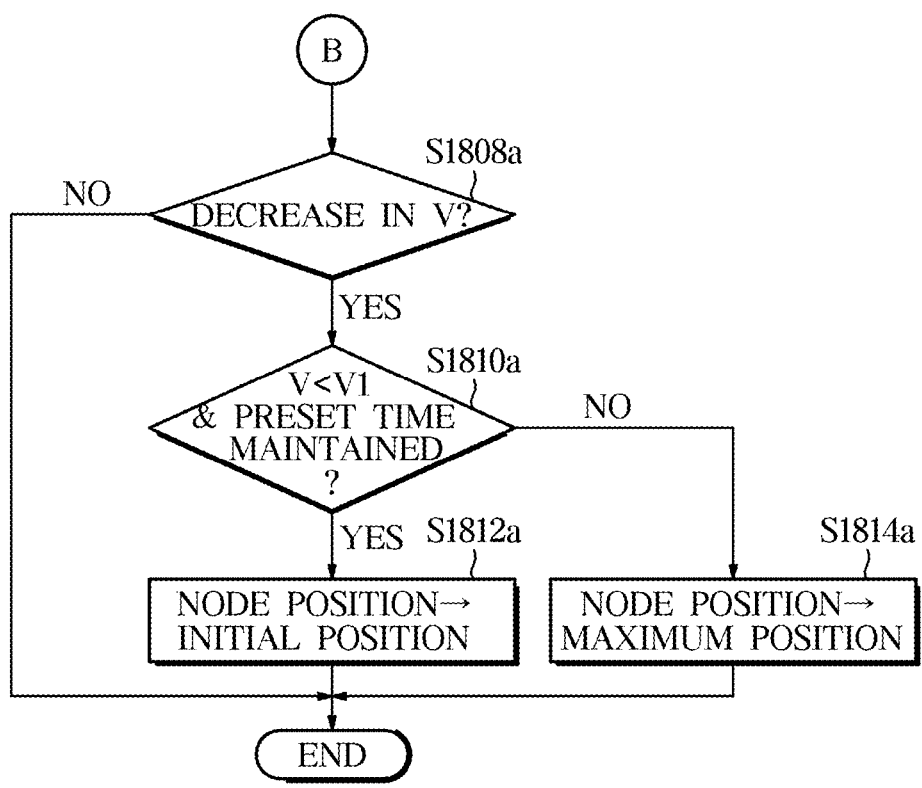

FIGS. 19 and 20 are flowchart showing a vehicle control method of a vehicle control apparatus according to an embodiment of the present invention, which illustrates an example of changing a stroke node position of an upper arm in an automatic mode.

Figure 21:
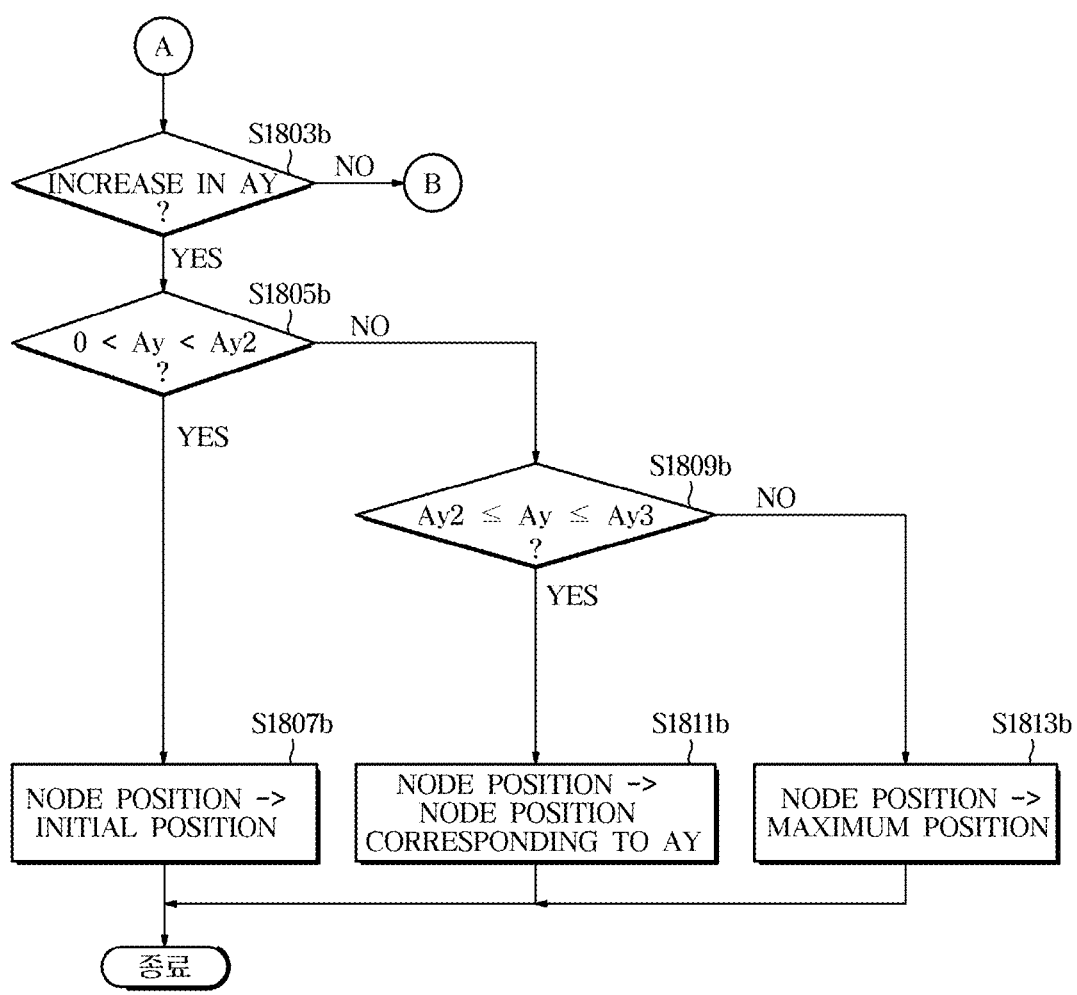
FIGS. 21 and 22 are flowchart showing a vehicle control method of a vehicle control apparatus according to an embodiment of the present invention, which illustrates another example of changing a stroke node position of an upper arm in an automatic mode.
Figure 22:
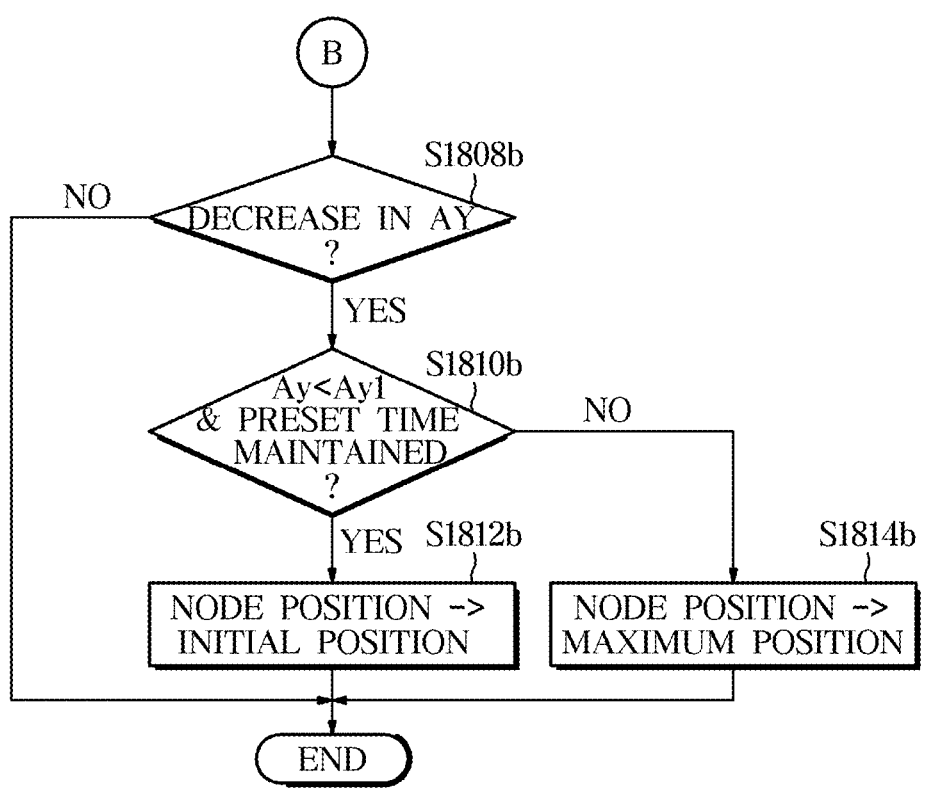

FIGS. 21 and 22 are flowchart showing a vehicle control method of a vehicle control apparatus according to an embodiment of the present invention, which illustrates another example of changing a stroke node position of an upper arm in an automatic mode.

Referring to FIG. 18, a vehicle control method 1800 of a vehicle control apparatus (100 of FIG. 1) according to an embodiment of the present invention includes first determination (S1801), second determination (S1804), and first control (S1806).

In the first determination S1801, the controller (106 in FIG. 1) determine a manual mode for manually adjusting the stroke node position of the upper arm (20L or 20R in FIG. 2) according to a command of a driver or an automatic mode for automatically adjusting the stroke node position (SP1 to SP2 in FIGS. 6 to 17) of the upper arm (20L or 20R in FIG. 2) according to a steering intention of a driver.

In the second determination S1804, the controller (106 in FIG. 1), upon confirming the manual mode, determines the stroke node position of the upper arm (20L or 20R in FIG. 2) input by the driver.

For example, in the second determination S1804, the controller (106 in FIG. 1) may determine the stroke node position of the upper arm (20L or 20R in FIG. 2) to be one of three node positions of 0, −30 mm and −40 mm that are input by the driver.

In the first control S1806, the controller (106 in FIG. 1) moves the upper arm (20L or 20R in FIG. 2) to the determined stroke node position.

For example, in the first control S1806, the controller (106 in FIG. 1 may move the upper arm (20L or 20R in FIG. 2) to one of the stroke node positions of 0, −30 mm and −40 mm that is determined by the controller (106 in FIG. 1).

Referring to FIGS. 19 and 20, the vehicle control method 1800 of the vehicle control apparatus (100 of FIG. 1) according to the embodiment of the present invention may include third determination (S1803a), fourth determination (S1805a), fifth determination (S1809a), sixth determination (S1808a), seventh determination (S1810a), second control (S1807a), third control (S1811a), fourth control (S1813a), fifth control (S1812a), and sixth control (S1814a).

In this case, in the second control S1807a, the third control S1811a, and the fourth control S1813a, the controller (106 in FIG. 1) determines the stroke node position (SP1 to SP2 in FIGS. 6 to 11) to which the upper arm (20L or 20R in FIG. 2) is to be moved on the basis of the vehicle speed value sensed by the sensor (102 in see FIG. 1).

Here, in the second control S1807a, the third control S1811a, and the fourth control S1813a, the controller (106 in FIG. 1) shifts the stroke node of the upper arm (20L or 20R in FIG. 2) to a corresponding position from the initial position (SP1 in FIGS. 6 to 11) to the maximum position (SP2 in FIGS. 6 to 11) according to the sensed vehicle speed value.

In this case, in the second control S1807a, the third control S1811a, and the fourth control S1813a, the controller (106 in FIG. 1) shifts the stroke node of the upper arm (20L or 20R in FIG. 2) to be close to the maximum position (SP2 in FIGS. 6 to 11) as the sensed vehicle speed value increases.

In detail, in the third determination S1803a, the controller (106 in FIG. 1) determines whether a vehicle speed value V sensed by the sensor (102 in FIG. 1) increases.

In the fourth determination S1805a, the controller (106 in FIG. 1), upon determining in S1803a that the vehicle speed value V increases, determines whether the sensed vehicle speed value V is in a first range of 0 to V2 set in the controller (106 in FIG. 1).

In the second control S1807a, the controller (106 in FIG. 1), upon determining in S1805a that the sensed vehicle speed value V is in the first range from 0 to V2, may maintain the stroke node of the upper arm (20L or 20R in FIG. 2) at the initial position (SP1 in FIG. 6).

In this case, the initial position (SP1 in FIG. 6) may be a position of 10 mm.

In the fifth determination S1809a, the controller (106 in FIG. 1), upon determining in S1805a that the sensed vehicle speed value V is at an outside of the first range of 0 to V2, may determine whether the sensed vehicle speed value V is in a second range of V2 to V3.

In the third control S1811a, the controller (106 in FIG. 1), upon determining in S1809a that the sensed vehicle speed value V is in the second range of V2 to V3, may shift the stroke node of the upper arm (20L or 20R in FIG. 2) to a stroke node position (SP1 to SP2 in FIG. 7) according to the sensed vehicle speed value V such that the stroke node position is linearly increased as the sensed vehicle speed value increases.

In this case, the stroke node position (SP1 to SP2 in FIG. 7) corresponding to the sensed vehicle speed value V may be in a range of 10 mm to −40 mm.

In the fourth control S1813a, the controller (106 in FIG. 1), upon determining in S1809a that the sensed vehicle speed value V is higher than the preset maximum value V3, may shift the stork node of the upper arm (20L or 20R in FIG. 2) to the maximum position (SP2 in FIG. 8).

In this case, the maximum position (SP2 in FIG. 8) may be a position of −40 mm.

In the sixth determination S1808a, the controller (106 in FIG. 1) determines whether the vehicle speed value V sensed by the controller (106 in FIG. 1) is decreasing.

In the seventh determination S1810a, the controller (106 in FIG. 1), upon determining in S1808a that the vehicle speed value V sensed by the controller (106 in FIG. 1) is decreasing, determines whether the vehicle speed value V is lower than a preset minimum value (V1 in FIG. 10) for a preset period of time (t in FIG. 10) set in the controller (106 in FIG. 1).

Figure 11:
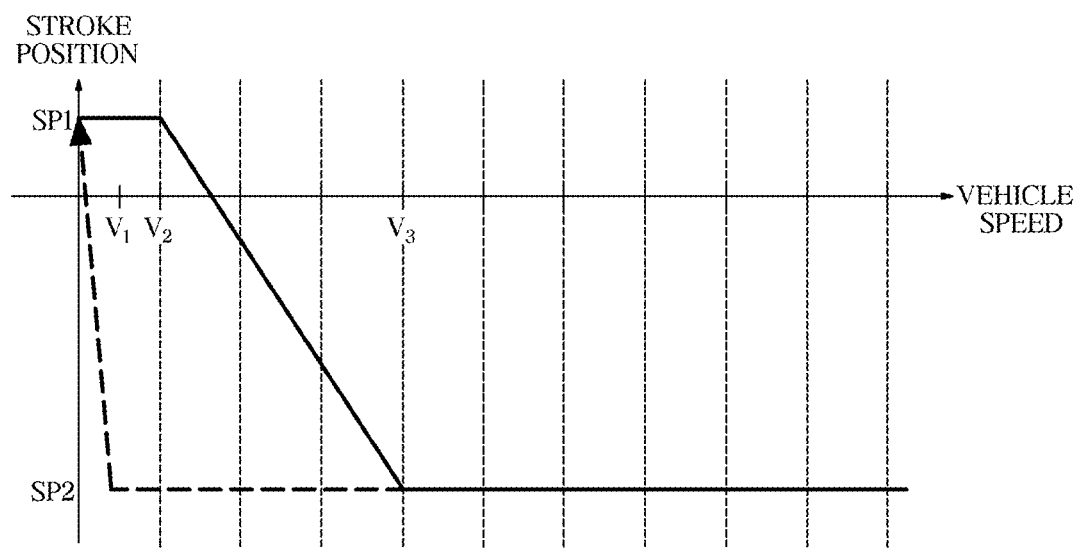

In the fifth control S1812a, the controller (106 in FIG. 1) upon determining in S1810a that the sensed vehicle speed value V is lower than the preset minimum value (V1 in FIG. 10) for the preset period of time (t in FIG. 10), may shift the stroke node of the upper arm (20L or 20R in FIG. 2) to the initial position (SP1 in FIG. 11).

In this case, the initial position (SP1 in FIG. 11) may be a position of 10 mm.

Figure 9:
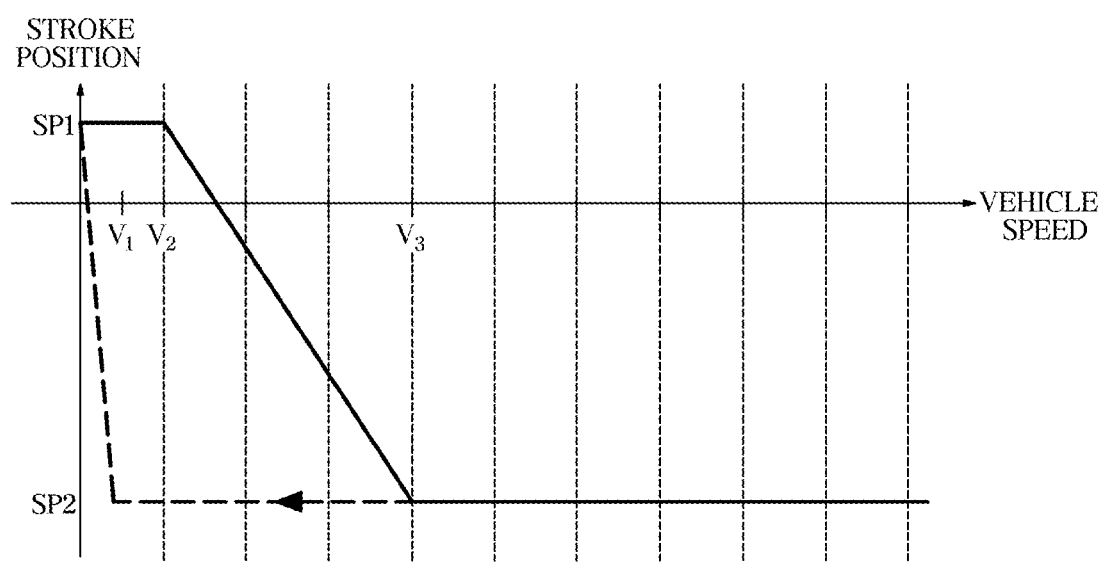
Figure 10:
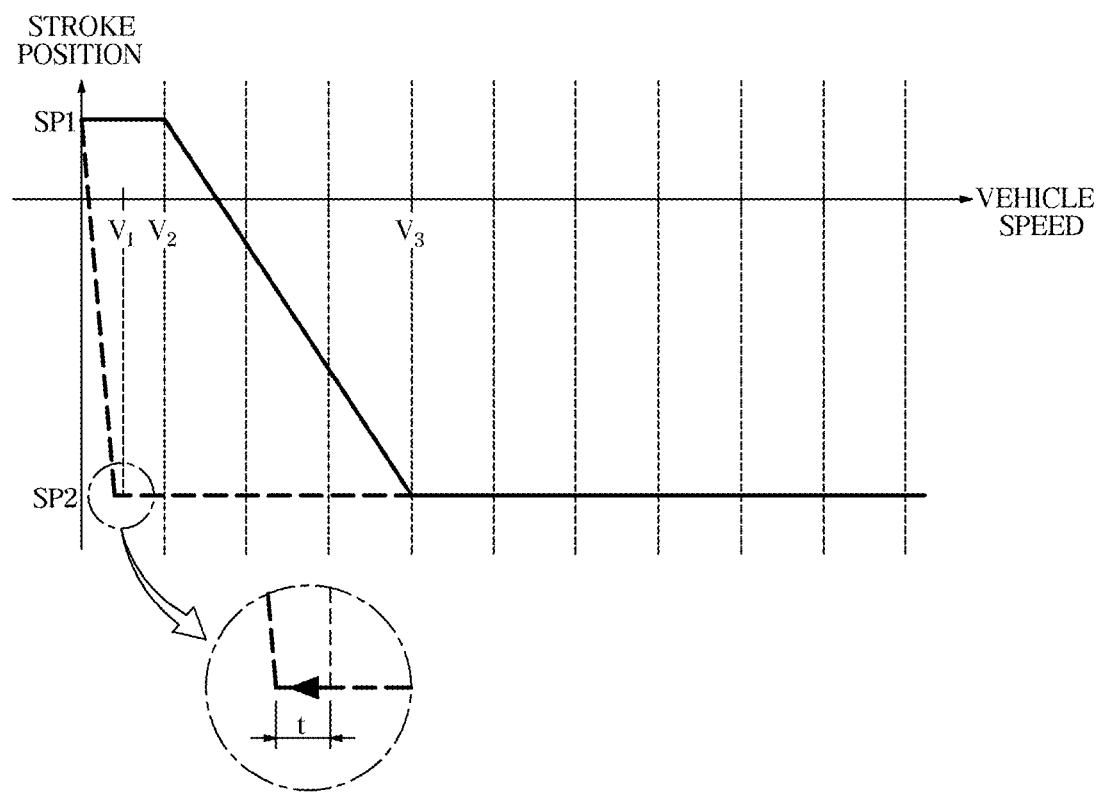

In the sixth control S1814a, the controller (106 in FIG. 1), upon determining in S1810a that the sensed vehicle speed value V is not lower than the preset minimum value (V1 in FIG. 10) or is not maintained for the preset time (t in FIG. 10), maintains the stroke node of the upper arm (20L or 20R in FIG. 2) at the maximum position (SP2 in FIG. 9).

In this case, the maximum position (SP2 in FIG. 9) may be a position of −40 mm.

Referring to FIGS. 21 and 22, the vehicle control method 1800 of the vehicle control apparatus (100 of FIG. 1) according to the embodiment of the present invention may include third determination (S1803b), fourth determination (S1805b), fifth determination (S1809b), sixth determination (S1808b), seventh determination (S1810b), second control (S1807b), third control (S1811b), fourth control (S1813b), fifth control (S1812b), and sixth control (S1814b).

In this case, in the second control S1807b, the third control S1811b, and the fourth control S1813b, the controller (106 in FIG. 1) determines the stroke node position (SP1 to SP2 in FIGS. 12 to 17) to which the upper arm (20L or 20R in FIG. 2) is to be moved, on the basis of the sensed lateral acceleration value.

In this case, in the second control S1807b, the third control S1811b, and the fourth control S1813b, the controller (106 in FIG. 1) shifts the stroke node of the upper arm (20L or 20R in FIG. 2) to a corresponding position from an initial position (SP1 in FIGS. 12 to 17) to a maximum position (SP2 in FIGS. 12 to 17) according to the sensed lateral acceleration value.

In this case, in the second control S1807b, the third control S1811b, and the fourth control S1813b, the controller (106 in FIG. 1) shifts the stroke node of the upper arm (20L or 20R in FIG. 2) to be close to the maximum position (SP2 in FIGS. 12 to 17) as the sensed lateral acceleration value increases.

In other words, in the third determination S1803b, the controller (106 in FIG. 1) determines whether a lateral acceleration value Ay sensed by the sensor (102 in FIG. 1) increases.

In the fourth determination S1805b, the controller (106 in FIG. 1), upon determining S1803b that the lateral acceleration value Ay increases, determines whether the sensed acceleration value Ay is in a first range of 0 to Ay2 set in the controller (106 in FIG. 1).

In the second control S1807b, the controller (106 in FIG. 1), upon determining S1805b that the sensed lateral acceleration value Ay is in the first range from 0 to Ay2 set in the controller (106 in FIG. 1), may maintain the stroke node of the upper arm (20L or 20R in FIG. 2) at the initial position (SP1 in FIG. 12).

In this case, the initial position (SP1 in FIG. 12) may be a position of 10 mm.

In the fifth determination S1809b, the controller (106 in FIG. 1), upon determining S1805b that the sensed lateral acceleration value Ay is at an outside of the first range of 0 to Ay2 set in the controller (106 in FIG. 1), may determine whether the sensed lateral acceleration value Ay is in a second range of Ay2 to Ay3.

In the third control S1811b, the controller (106 in FIG. 1), upon determining S1809b that the sensed lateral acceleration value Ay is in the second range of Ay2 to Ay3, may shift the stroke node of the upper arm (20L or 20R in FIG. 2) to a stroke node position (SP1 to SP2 in FIG. 13) according to the sensed lateral acceleration value Ay such that the stroke node position is linearly increased as the sensed lateral acceleration value increases In this case, the stroke node position (SP1 to SP2 in FIG. 13) corresponding to the sensed lateral acceleration value may be in a range of 10 mm to −40 mm.

In the fourth control S1813b, the controller (106 in FIG. 1), upon determining S1809b that the sensed lateral acceleration value Ay is higher than the preset maximum value Ay3 set in the controller (106 in FIG. 1), may shift the stork node of the upper arm (20L or 20R in FIG. 2) to the maximum position (SP2 in FIG. 14).

In this case, the maximum position (SP2 in FIG. 8) may be a position of −40 mm.

In the sixth determination S1808b, the controller (106 in FIG. 1) determines whether the lateral acceleration value Ay sensed by the controller (106 in FIG. 1) is decreasing.

In the seventh determination S1810b, the controller (106 in FIG. 1), upon determining S1808b that the sensed lateral acceleration value Ay is decreasing, determines whether the sensed lateral acceleration value Ay is lower than a preset minimum value (Ay1 in FIG. 16) for a preset period of time (t in FIG. 16) set in the controller (106 in FIG. 1).

Figure 17:
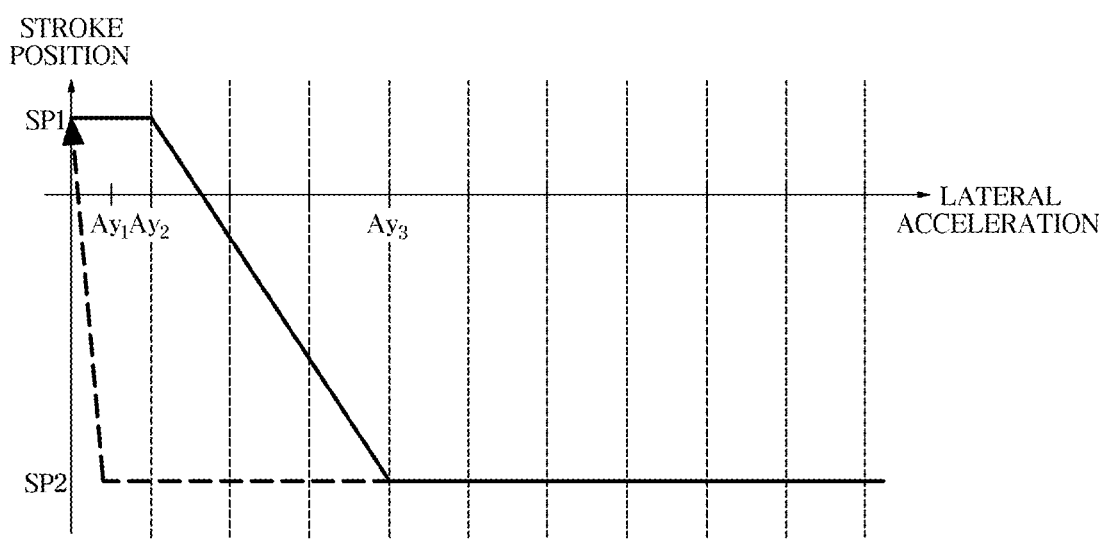

In the fifth control S1812b, the controller (106 in FIG. 1) upon determining S1810b that the sensed lateral acceleration value Ay is lower than the preset minimum value (Ay1 in FIG. 16) for the preset period of time (t in FIG. 16), may shift the stroke node of the upper arm (20L or 20R in FIG. 2) to the initial position (SP1 in FIG. 17).

In this case, the initial position (SP1 in FIG. 11) may be a position of 10 mm.

Figure 15:
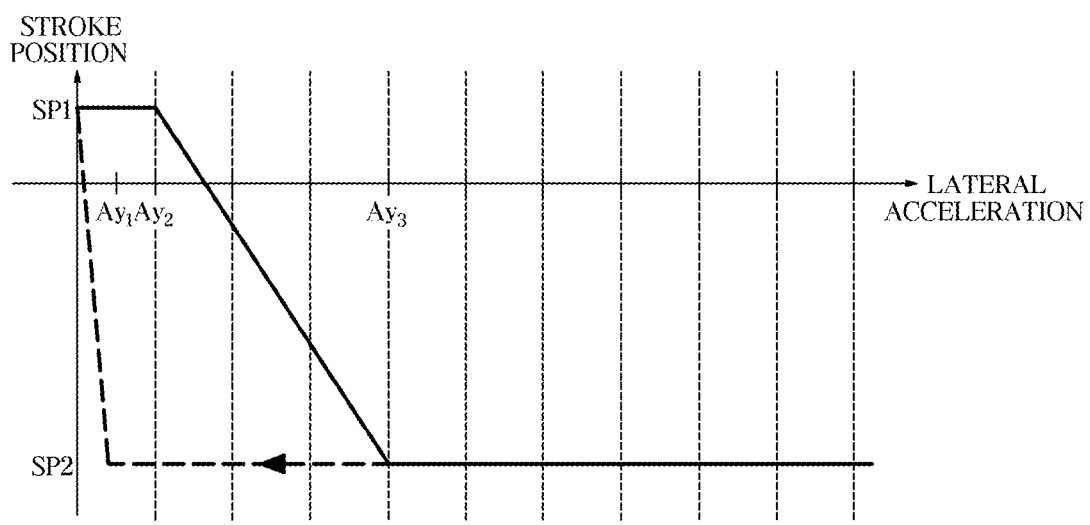
Figure 16:
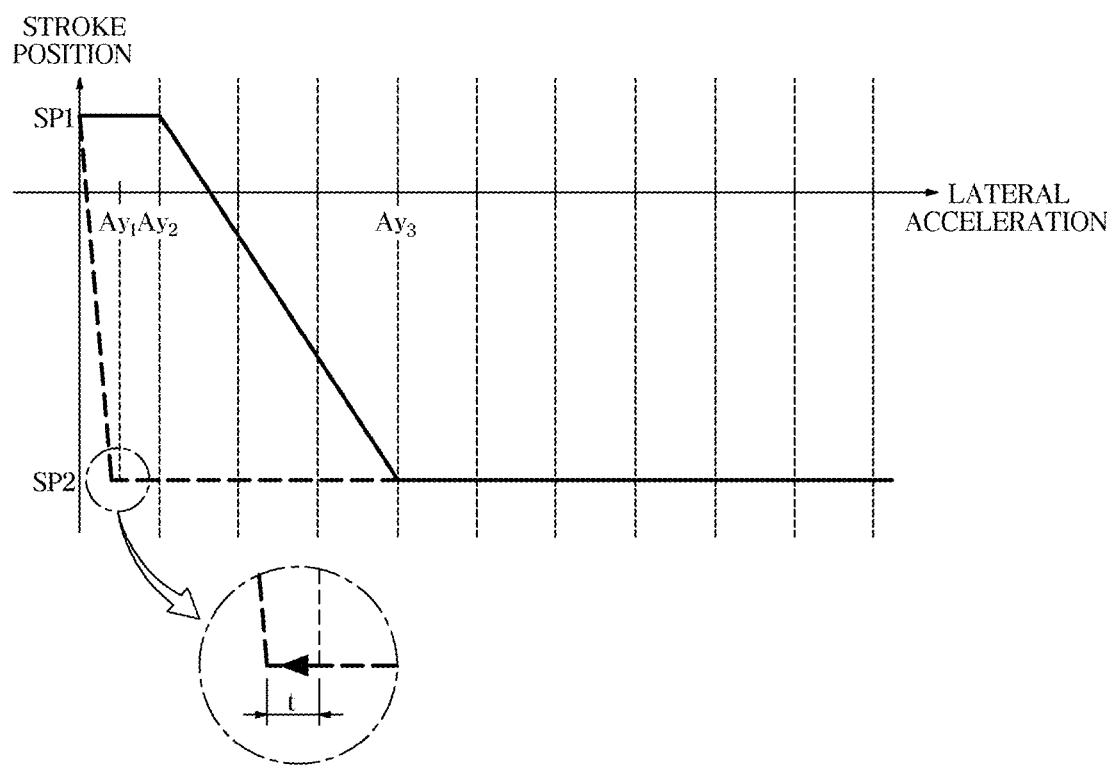

In the sixth control S1814b, the controller (106 in FIG. 1), upon determining S1810b that the sensed lateral acceleration value Ay is not lower than the preset minimum value (Ay1 in FIG. 16) or is not maintained for the preset time (t in FIG. 16), maintains the stroke node of the upper arm (20L or 20R in FIG. 2) at the maximum position (SP2 in FIG. 15).

In this case, the maximum position (SP2 in FIG. 15) may be a position of −40 mm.

Figure 23:
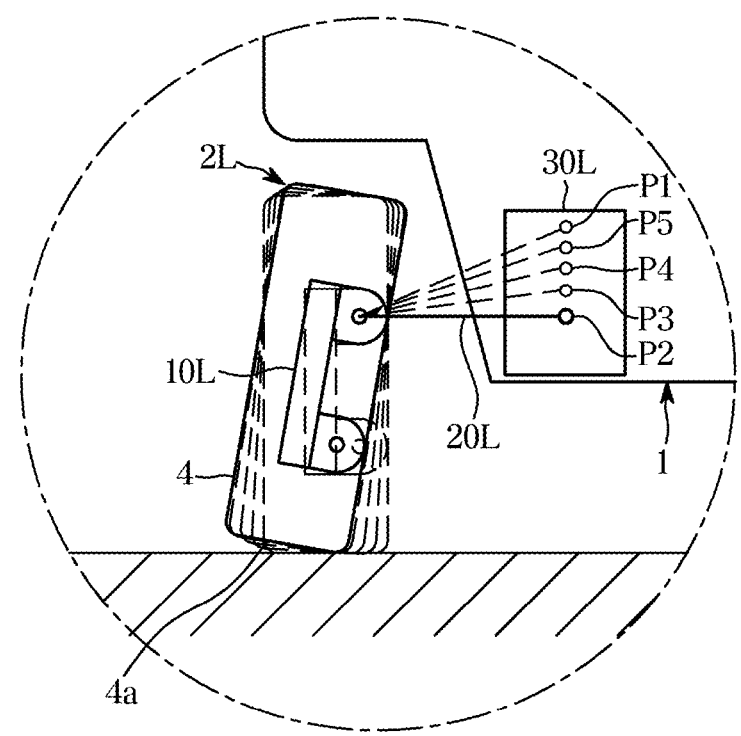
FIG. 23 is a diagram illustrating an example of a stroke node position being varied by the active camber device shown in FIG. 1.

FIG. 23 is a diagram illustrating an example of a stroke node position being varied by the active camber device shown in FIG. 1.

FIG. 24 is a graph showing an example in which a controller shown in FIG. 1 transmits a first drive command to the active camber device such that a stroke position value is shifted to a first target stroke position value in advance.

FIG. 25 is a graph showing an example in which a controller shown in FIG. 1 transmits a second drive command to the active camber device such that a stroke position value is shifted to a second target stroke position value in advance.

FIG. 26 is a graph showing an example in which a controller shown in FIG. 1 transmits a third drive command to the active camber device such that a stroke position value is shifted to a third target stroke position value in advance.

Figure 27:
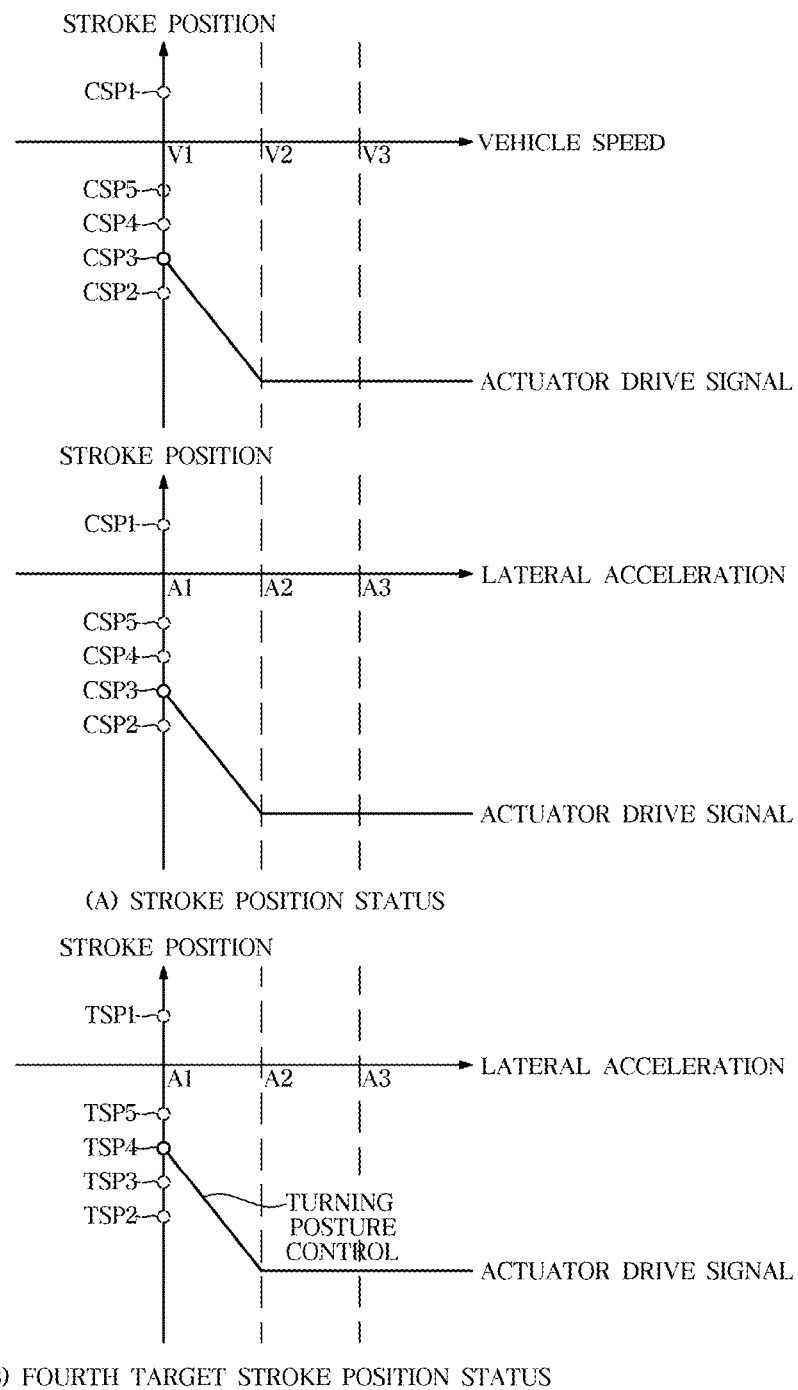
FIG. 27 is a graph showing an example in which a controller shown in FIG. 1 transmits a fourth drive command to the active camber device such that a stroke position value is shifted to a fourth target stroke position value in advance.

FIG. 27 is a graph showing an example in which a controller shown in FIG. 1 transmits a fourth drive command to the active camber device such that a stroke position value is shifted to a fourth target stroke position value in advance.

FIG. 28 is a graph showing an example in which a controller shown in FIG. 1 transmits a fifth drive command to the active camber device such that a stroke position value is shifted to a fifth target stroke position value in advance.

Referring to FIG. 1 and FIGS. 23 to 28, the controller 106 of the vehicle control apparatus 100 according to the embodiment of the present invention determines a status of a steering intention of a driver using the sensed lateral acceleration value.

The controller 106, upon determining the status of the steering intention of the driver, transmits a drive command to the active chamber device 104 such that a stroke position value CSP1, CSP2, CSP3 or CSP4 of the active camber device 104 is shifted to a target stroke position value TSP1, TSP2, TSP3, or TSP4 that is set to correspond to a speed range of the vehicle and a degree of a steering intention of the driver during a turning posture pre-control period in advance, to reduce a turning posture control time in which the active camber device 104 performs a turning posture control corresponding to a turning direction during a turning posture control period.

For example, referring to FIG. 23, the active camber device 104 may include an actuator 30L, an upper arm 20L, and a knuckle 10L.

Here, the actuator 30L may be connected to the upper arm 20L, and the upper arm 20L may pull the knuckle 10L supporting the left wheel 2L of the vehicle 1 according to the driving of the actuator 30L to thereby perform a right turning posture control corresponding to a right turning direction.

In this case, the controller 106 may transmit a drive command to the actuator 30L such that a stroke position value CSP1, CSP2, CSP3 or CSP4 of the actuator 30L is shifted to a stroke node position P1, P2, P3, P4 or P5 corresponding to a target stroke position value TSP1, TSP2, TSP3, TSP4, or TSP5 that are set to correspond to a speed range (0 to V1; V1 to V2; V2 to V3), and a degree of driver steering intention (0 to A1; A1 to A2; A2 to A3).

As an example, referring to FIGS. 1 to 3, the controller 106 may determine whether the current state is a first state in which the vehicle is stopped or travels straight in a low speed range using the sensed vehicle speed value of 0 to V1.

In this case, the controller 106, upon determining the current state to be the first state, may transmit a first drive command to the active camber device 104 such that the stroke position value CSP1 of the active camber device 104 is shifted to a first target stroke position value TSP1 that is set to correspond to the first state during the turning posture pre-control period in advance.

For example, the controller 106, upon determining the current state to be the first state, may transmit a first drive command to the actuator 30L such that the stroke position value CSP1 of the actuator 30L is shifted to a stroke node position P1 of the actuator 30L corresponding to a first target stroke position value TSP1 that is set to correspond to the first state during the turning posture pre-control period in advance.

In this case, the stroke node position P1 of the actuator 30L corresponding to the first target stroke position value TSP1 may be the initial node position.

As an example, referring to FIGS. 1, 23, and 25, the controller 106, upon determining the current state not to be the first state, may determine whether the current state is a second state in which the steering intention of the driver is low using the sensed lateral acceleration value of 0 to A1.

In this case, the controller 106, upon determining the current state to be the second state, may transmit a second drive command to the active camber device 104 such that the stroke position value CSP1 of the active camber device 104 is shifted to a second target stroke position value TSP2 that is set to correspond to the second state during the turning posture pre-control period in advance.

For example, the controller 106, upon determining the current state to be the second state, may transmit a second drive command to the actuator 30L such that the stroke position value CSP1 of the actuator 30L is shifted to a stroke node position P2 of the actuator 30L corresponding to a second target stroke position value TSP2 that is set to correspond to the second state during the turning posture pre-control period in advance.

In this case, the stroke node position P2 of the actuator 30L corresponding to the second target stroke position value TSP2 may be the maximum node position.

As an example, referring to FIGS. 1, 23, and 26, the controller 106, upon determining the current state not to be the second state, may determine whether the current state is a third state in which the vehicle travels straight in a high speed range using the sensed vehicle speed value of V2 to V3 and the sensed lateral acceleration value of A2 to A3.

In this case, the controller 106, upon determining the current state to be the third state, may transmit a third drive command to the active camber device 104 such that the stroke position value CSP2 of the active camber device 104 is shifted to a third target stroke position value TSP3 that is set to correspond to the third state during the turning posture pre-control period in advance.

For example, the controller 106, upon determining the current state to be the third state, may transmit a third drive command to the actuator 30L such that the stroke position value CSP2 of the actuator 30L is shifted to a stroke node position P3 of the actuator 30L corresponding to a third target stroke position value TSP3 that is set to correspond to the third state during the turning posture pre-control period in advance.

As an example, referring to FIGS. 1, 23, and 27, the controller 106, upon determining the current state not to be the third state, may determine whether the current state is a fourth state in which the vehicle travels straight in an intermediate speed range using the sensed vehicle speed value of V1 to V2 and the sensed lateral acceleration value of A1 to A2.

In this case, the controller 106, upon determining the current state to be the fourth state, may transmit a fourth drive command to the active camber device 104 such that the stroke position value CSP3 of the active camber device 104 is shifted to a fourth target stroke position value TSP4 that is set to correspond to the fourth state during the turning posture pre-control period in advance.

For example, the controller 106, upon determining the current state to be the fourth state, may transmit a fourth drive command to the actuator 30L such that the stroke position value CSP3 of the actuator 30L is shifted to a stroke node position P4 of the actuator 30L corresponding to a fourth target stroke position value TSP4 that is set to correspond to the fourth state during the turning posture pre-control period in advance.

As an example, referring to FIGS. 1, 23, and 28, the controller 106, upon determining the current state not to be the fourth state, may determine whether the current state is a fifth state in which the vehicle travels straight in a low speed range using the sensed vehicle speed value of 0 to V1 and the sensed lateral acceleration value of 0 to A1.

In this case, the controller 106, upon determining the current state to be the fifth state, may transmit a fifth drive command to the active camber device 104 such that the stroke position value CSP4 of the active camber device 104 is shifted to a fifth target stroke position value TSP5 that is set to correspond to the fifth state during the turning posture pre-control period in advance.

For example, the controller 106, upon determining the current state to be the fifth state, may transmit a fifth drive command to the actuator 30L such that the stroke position value CSP4 of the actuator 30L is shifted to a stroke node position P5 of the actuator 30L corresponding to a fifth target stroke position value TSP5 that is set to correspond to the fifth state during the turning posture pre-control period in advance.

The controller 106 of the vehicle control apparatus 100 according to the embodiment of the present invention may further determine whether the stroke position values CSP2 to CSP4 each are shifted to a corresponding one of the target stroke position values TSP3 to TSP5.

In this case, the controller 106, upon determining that each of the stroke position values CSP2 to CSP4 is shifted to a corresponding one of the target stroke position values TSP3 to TSP5, may be further configured to transmit a control command to the active camber device 104 such that the active camber device 104 performs a turning posture control corresponding to a turning direction during a turning posture control period.

As an example, referring to FIGS. 1, 23, and 26, the controller 106 may be further configured to determine whether the stroke position value CSP2 has been shifted to the third target stroke position value TSP3 that is set to correspond to the third state in which the vehicle travels straight in a high speed range.

In this case, the controller 106, upon determining that the stroke position value CSP2 is shifted to the third target stroke position value TSP3, may be configured to transmit a first control command to the active camber device 104 such that the active camber device 104 performs a turning posture control corresponding to a turning direction during the turning posture control period.

For example, the controller 106, upon determining that the stroke position value CSP2 of the actuator 30L is shifted to the stroke node position P3 of the actuator 30L corresponding to the third target stroke position value TSP3 that is set to correspond to the third state during the turning posture pre-posture period, may be configured to transmit a first control command to the actuator 30L such that the actuator 30L performs a right-turning posture control corresponding to a right-turning direction during the turning posture control period.

As an example, referring to FIGS. 1, 23, and 27, the controller 106 may be further configured to determine whether the stroke position value CSP3 has been shifted to the fourth target stroke position value TSP4 that is set to correspond to the fourth state in which the vehicle travels straight in an intermediate speed range.

In this case, the controller 106, upon determining that the stroke position value CSP3 is shifted to the fourth target stroke position value TSP4, may be configured to transmit a second control command to the active camber device 104 such that the active camber device 104 performs a turning posture control corresponding to a turning direction during the turning posture control period.

For example, the controller 106, upon determining that the stroke position value CSP3 of the actuator 30L is shifted to the stroke node position P4 of the actuator 30L corresponding to the fourth target stroke position value TSP4 that is set to correspond to the fourth state during the turning posture pre-posture period, may be configured to transmit a second control command to the actuator 30L such that the actuator 30L performs a right-turning posture control corresponding to a right turning direction during the turning posture control period.

As an example, referring to FIGS. 1, 23, and 28, the controller 106 may be further configured to determine whether the stroke position value CSP4 has been shifted to the fifth target stroke position value TSP5 that is set to correspond to the fifth state in which the vehicle travels straight in a low speed range.

In this case, the controller 106, upon determining that the stroke position value CSP4 is shifted to the fifth target stroke position value TSP5, may be configured to transmit a third control command to the active camber device 104 such that the active camber device 104 performs a turning posture control corresponding to a turning direction during the turning posture control period.

For example, the controller 106, upon determining that the stroke position value CSP4 of the actuator 30L is shifted to the stroke node position P5 of the actuator 30L corresponding to the fifth target stroke position value TSP5 that is set to correspond to the fifth state during the turning posture pre-posture period, may be configured to transmit a third control command to the actuator 30L such that the actuator 30L performs a right-turning posture control corresponding to a right-turning direction during the turning posture control period.

Figure 29:
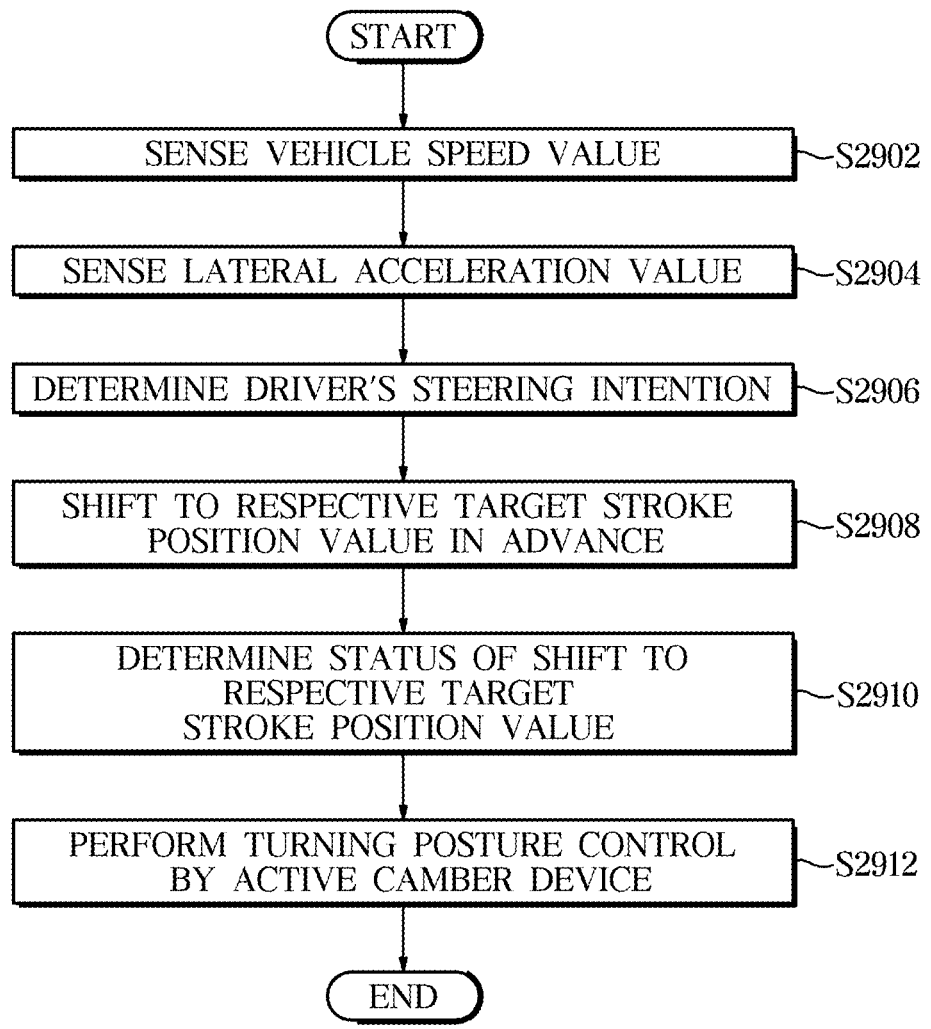
FIG. 29 is a flowchart showing an example of a vehicle control method for a vehicle control apparatus according to an embodiment of the present invention.
Figure 30:
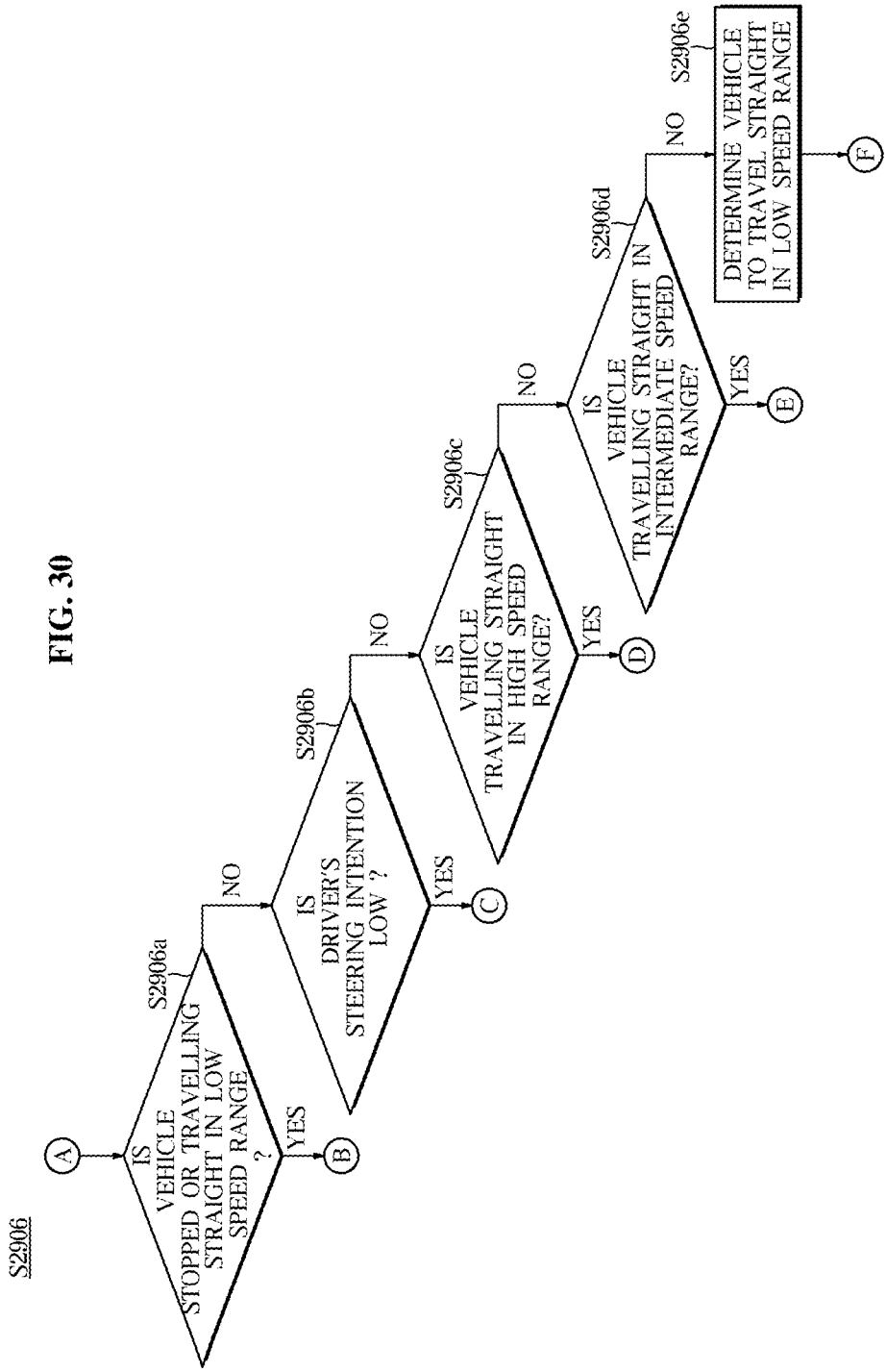
FIG. 30 is a flowchart showing an example of a first determination shown in FIG. 29.

FIG. 29 is a flowchart showing an example of a vehicle control method for a vehicle control apparatus according to an embodiment of the present invention, and FIG. 30 is a flowchart showing an example of a first determination shown in FIG. 29.

Figure 31:
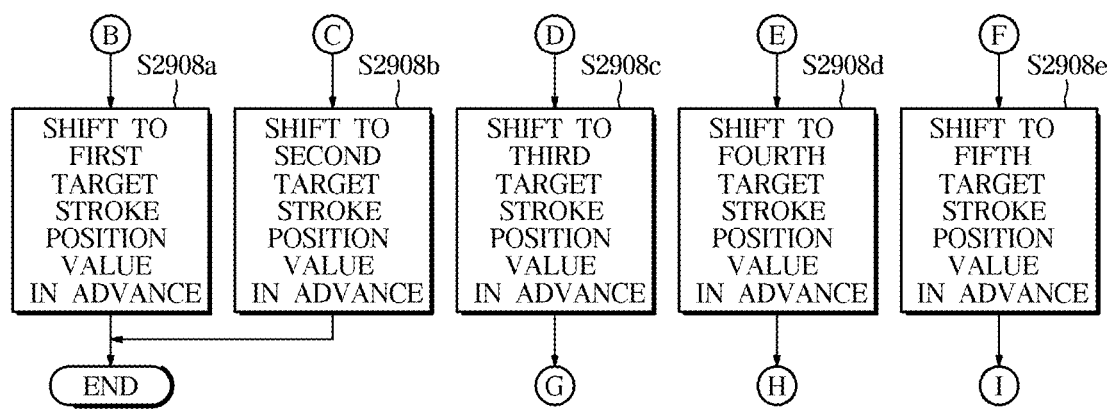
FIG. 31 is a flowchart showing an example of a first control shown in FIG. 29.
Figure 32:
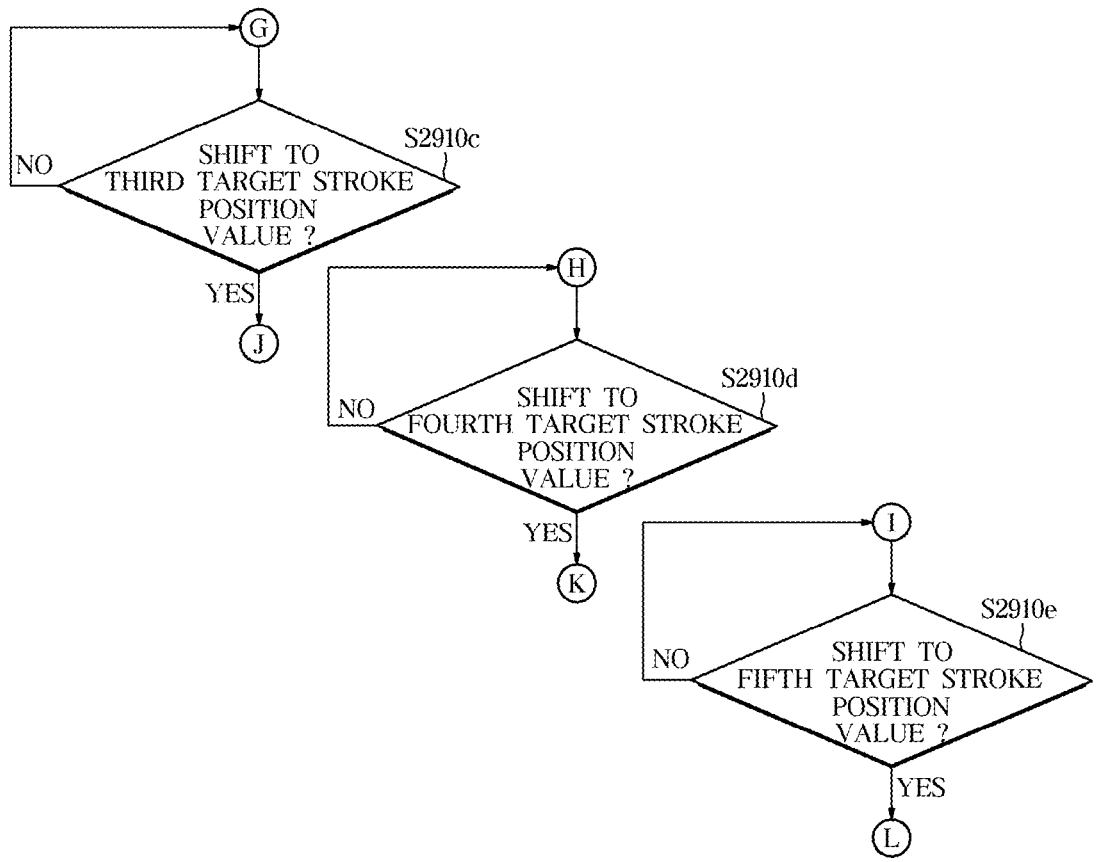
FIG. 32 is a flowchart showing an example of a second determination shown in FIG. 29.

FIG. 31 is a flowchart showing an example of a first control shown in FIG. 29, and FIG. 32 is a flowchart showing an example of a second determination shown in FIG. 29.

Figure 33:
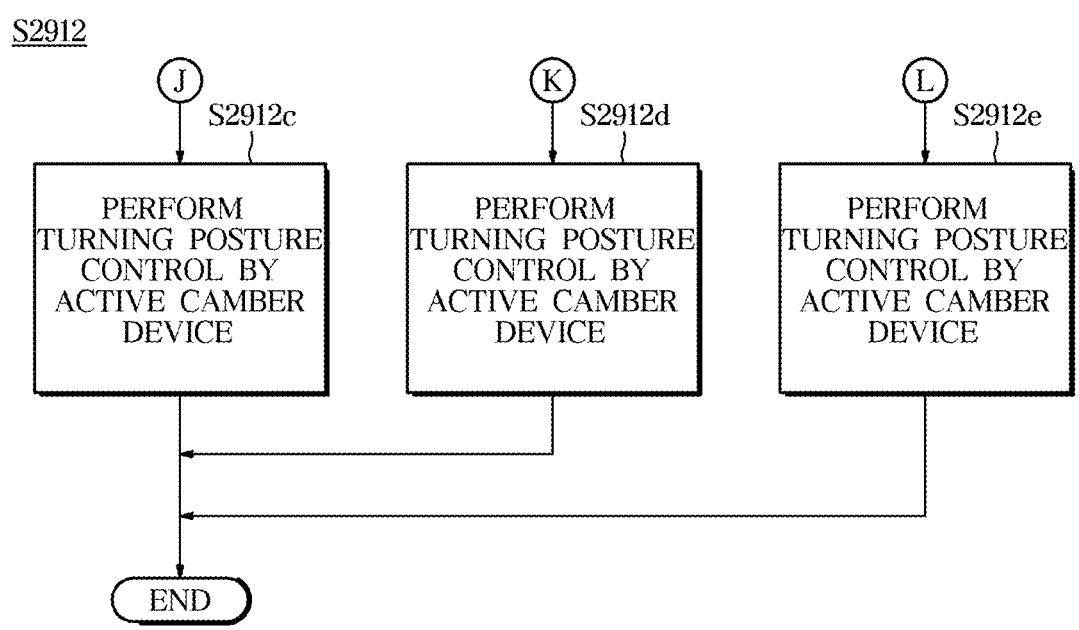
FIG. 33 is a flowchart showing an example of a second control shown in FIG. 29.

FIG. 33 is a flowchart showing an example of a second control shown in FIG. 29.

FIGS. 29 to 33, a vehicle control method 2900 of the vehicle control apparatus (100 of FIG. 1) according to an embodiment of the present invention includes first sensing S2902, second sensing S2904, first determination S2906, first control S2908, second determination S2910, and second control S2912.

In the first sensing S2902, the sensor (102 in FIG. 2) may sense a vehicle speed value.

In the second sensing S2904, the sensor (102 in FIG. 2) may sense a lateral acceleration value generated at a time of turning of the vehicle.

In the first determination S2906, the controller (106 in FIG. 1) determines a status of a steering intention of the driver using the lateral acceleration value sensed by the sensor (102 in FIG. 1).

In the first control S2908, the controller (106 in FIG. 1), upon determining the status of the steering intention of the driver, transmits a drive command to the active chamber device (104 in FIG. 1) such that a stroke position value (CSP1, CSP2, CSP3 or CSP4 in FIGS. 3 to 7) of the active camber device (104 in FIG. 1) is shifted to a target stroke position value (TSP1, TSP2, TSP3, or TSP4 in FIGS. 24 to 28) that is set to correspond to a speed range of the vehicle and a degree of steering intention of the driver during a turning posture pre-control period in advance, to reduce a turning posture control time in which the active camber device (104 in FIG. 1) performs a turning posture control corresponding to a turning direction during a turning posture control period.

As an example, in the first determination S2906a, the controller (106 in FIG. 1) may determine whether the current state is a first state in which the vehicle is stopped or travels straight in a low speed range using the sensed vehicle speed value (0 to V1 in FIG. 3) sensed by the sensor (102 in FIG. 1).

Thereafter, in the first control S2908a, the controller (106 in FIG. 1), upon determining the current state to be the first state, may transmit a first drive command to the active camber device (104 in FIG. 1) such that the stroke position value (CSP1 in FIG. 24) of the active camber device (104 in FIG. 1) is shifted to a first target stroke position value (TSP1 in FIG. 24) that is set to correspond to the first state during the turning posture pre-control period in advance.

For example, in the first control S2908a, the controller (106 in FIG. 1), upon determining the current state to be the first state, may transmit a first drive command to the actuator (30L in FIG. 23) such that the stroke position value (CSP1 in FIG. 24) of the actuator (30L in FIG. 23) is shifted to a stroke node position (P1 in FIG. 23) of the actuator (30L in FIG. 23) corresponding to a first target stroke position value (TSP1 in FIG. 24) that is set to correspond to the first state during the turning posture pre-control period in advance.

As an example, in the first determination S2906b, the controller (106 in FIG. 1), upon determining the current state not to be the first state, may determine whether the current state is a second state in which the steering intention of the driver is low using the sensed lateral acceleration value (0 to A1 in FIG. 4).

Thereafter, in the first control S2908b, the controller (106 in FIG. 1), upon determining the current state to be the second state, may transmit a second drive command to the active camber device (104 in FIG. 1) such that the stroke position value (CSP1 in FIG. 25) of the actuator (30L in FIG. 23) is shifted to a second target stroke position value (TSP2 in FIG. 25) that is set to correspond to the second state during the turning posture pre-control period in advance.

For example, in the first control S2908b, the controller (106 in FIG. 1), upon determining the current state to be the second state, may transmit a second drive command to the actuator (30L in FIG. 23) such that the stroke position value (CSP1 in FIG. 25) of the actuator (30L in FIG. 23) is shifted to a stroke node position (P2 in FIG. 23) of the actuator (30L in FIG. 23) corresponding to a second target stroke position value (TSP2 in FIG. 25) that is set to correspond to the second state during the turning posture pre-control period in advance.

As an example, in the first determination S2906c, the controller (106 in FIG. 1), upon determining the current state not to be the second state, may determine whether the current state is a third state in which the vehicle travels straight in a high speed range using the sensed vehicle speed value (V2 to V3 in FIG. 26) and the sensed lateral acceleration value (A2 to A3 in FIG. 5) that are sensed by the sensor (102 in FIG. 1).

Thereafter, in the first control S2908c, the controller (106 in FIG. 1), upon determining the current state to be the third state, may transmit a third drive command to the active camber device (104 in FIG. 1) such that the stroke position value (CSP2 in FIG. 26) of the active camber device (104 in FIG. 1) is shifted to a third target stroke position value (TSP3 in FIG. 26) that is set to correspond to the third state during the turning posture pre-control period in advance.

For example, in the first control S2908c, the controller (106 in FIG. 1), upon determining the current state to be the third state, may transmit a third drive command to the actuator (30L in FIG. 23) such that the stroke position value (CSP2 in FIG. 26) of the actuator (30L in FIG. 23) is shifted to a stroke node position (P3 in FIG. 23) of the actuator (30L in FIG. 23) corresponding to a third target stroke position value (TSP3 in FIG. 26) that is set to correspond to the third state during the turning posture pre-control period in advance.

As an example, in the first determination S2906d, the controller (106 in FIG. 1), upon determining the current state not to be the third state, may determine whether the current state is a fourth state in which the vehicle travels straight in an intermediate speed range using the sensed vehicle speed value (V1 to V2 in FIG. 27) and the sensed lateral acceleration value (A1 to A2 in FIG. 27) that are sensed by the sensor (102 in FIG. 2).

Thereafter, in the first control S2908d, the controller (106 in FIG. 1), upon determining the current state to be the fourth state, may transmit a fourth drive command to the active camber device (104 in FIG. 1) such that the stroke position value (CSP3 in FIG. 27) of the active camber device (104 in FIG. 1) is shifted to a fourth target stroke position value (TSP4 in FIG. 27) that is set to correspond to the fourth state during the turning posture pre-control period in advance.

For example, in the first control S2908d, the controller (106 in FIG. 1), upon determining the current state to be the fourth state, may transmit a fourth drive command to the actuator (30L in FIG. 23) such that the stroke position value (CSP3 in FIG. 27) of the actuator (30L in FIG. 23) is shifted to a stroke node position (P4 in FIG. 23) of the actuator (30L in FIG. 23) corresponding to a fourth target stroke position value (TSP4 in FIG. 27) that is set to correspond to the fourth state during the turning posture pre-control period in advance.

As an example, in the first determination S2906e, the controller (106 in FIG. 1), upon determining the current state not to be the fourth state, may determine whether the current state is a fifth state in which the vehicle travels straight in a low speed range using the vehicle speed value (0 to V1 in FIG. 28) and the sensed lateral acceleration value (0 to A1 in FIG. 28) that are sensed by the sensor (102 in FIG. 1).

Thereafter, in the first control S2908e, the controller (106 in FIG. 1), in response to determining the current state to be the fifth state, may transmit a fifth drive command to the active camber device (104 in FIG. 1) such that the stroke position value (CSP4 in FIG. 28) of the active camber device (104 in FIG. 1) is shifted to a fifth target stroke position value (TSP5 in FIG. 28) that is set to correspond to the fifth state during the turning posture pre-control period in advance.

For example, in the first control S2908e, the controller (106 in FIG. 1), upon determining the current state to be the fifth state, may transmit a fifth drive command to the actuator (30L in FIG. 23) such that the stroke position value (CSP4 in FIG. 28) of the actuator (30L in FIG. 23) is shifted to a stroke node position (P5 in FIG. 23) of the actuator (30L in FIG. 23) corresponding to a fifth target stroke position value (TSP5 in FIG. 28) that is set to correspond to the fifth state during the turning posture pre-control period in advance.

In the second determination S2910 of the vehicle control method 2900 of the vehicle control apparatus 100 of FIG. 1 according to the embodiment of the present invention, the controller (106 in FIG. 1) may further determine whether the stroke position values (CSP2 to CSP4 in FIGS. 26 to 28) each have been shifted to a corresponding one of the target stroke position values (TSP3 to TSP5 in FIGS. 26 to 28).

In the second control S2912, the controller 106, upon determining that each of the stroke position values (CSP2 to CSP4 in FIGS. 26 to 28) is shifted to a corresponding one of the target stroke position values (TSP3 to TSP5 in FIGS. 26 to 28), may be further configured to transmit a control command to the active camber device (104 in FIG. 1) such that the active camber device (104 in FIG. 1) performs a turning posture control corresponding to a turning direction during a turning posture control period.

As an example, in the second determination S2910c, the controller (106 in FIG. 1) may be further configured to determine whether the stroke position value (CSP2 in FIG. 26) has been shifted to the third target stroke position value (TSP3 in FIG. 26) that is set to correspond to the third state in which the vehicle travels straight in a high speed range.

Thereafter, in the second control S2912c, the controller (106 in FIG. 1), upon determining that the stroke position value (CSP2 in FIG. 26) is shifted to the third target stroke position value (TSP3 in FIG. 26), may be configured to transmit a first control command to the active camber device (104 in FIG. 1) such that the active camber device (104 in FIG. 1) performs a turning posture control corresponding to a turning direction during the turning posture control period.

For example, in the second control S2912c, the controller (106 in FIG. 1), upon determining that the stroke position value (CSP2 in FIG. 26) of the actuator (30L in FIG. 23) is shifted to the stroke node position (P3 in FIG. 23) of the actuator (30L in FIG. 23) corresponding to the third target stroke position value (TSP3 in FIG. 26) that is set to correspond to the third state during the turning posture pre-posture period, may be configured to transmit a first control command to the actuator (30L in FIG. 23) such that the actuator (30L in FIG. 23) performs a right-turning posture control corresponding to a right-turning direction during the turning posture control period.

As an example, in the second determination S2910d, the controller (106 in FIG. 1) may be further configured to determine whether the stroke position value (CSP3 in FIG. 27) has been shifted to the fourth target stroke position value (TSP4 in FIG. 27) that is set to correspond to the fourth state in which the vehicle travels straight in an intermediate speed range.

Thereafter, in the second control S2912d, the controller (106 in FIG. 1), upon determining that the stroke position value (CSP3 in FIG. 27) is shifted to the fourth target stroke position value (TSP4 in FIG. 27), may be configured to transmit a second control command to the active camber device (104 in FIG. 1) such that the active camber device (104 in FIG. 1) performs a turning posture control corresponding to a turning direction during the turning posture control period.

For example, in the second control S2912d, the controller (106 in FIG. 1), upon determining that the stroke position value (CSP3 in FIG. 27) of the actuator (30L in FIG. 23) is shifted to the stroke node position (P4 in FIG. 23) of the actuator (30L in FIG. 23) corresponding to the fourth target stroke position value (TSP4 in FIG. 27) that is set to correspond to the fourth state during the turning posture pre-posture period, may be configured to transmit a second control command to the actuator (30L in FIG. 23) such that the actuator (30L in FIG. 23) performs a right-turning posture control corresponding to a right-turning direction during the turning posture control period.

As an example, in the second determination S2910e, the controller (106 in FIG. 1) may be further configured to determine whether the stroke position value (CSP4 in FIG. 28) has been shifted to the fifth target stroke position value (TSP5 in FIG. 28) that is set to correspond to the fifth state in which the vehicle travels straight in a low speed range.

Thereafter, in the second control S2912e, the controller (106 in FIG. 1), upon determining that the stroke position value (CSP4 in FIG. 28) is shifted to the fifth target stroke position value (TSP5 in FIG. 28), may be configured to transmit a third control command to the active camber device (104 in FIG. 1) such that the active camber device (104 in FIG. 1) performs a turning posture control corresponding to a turning direction during the turning posture control period.

For example, in the second control S2912e, the controller (106 in FIG. 1), upon determining that the stroke position value (CSP4 in FIG. 28) of the actuator (30L in FIG. 23) is shifted to the stroke node position (P5 in FIG. 23) of the actuator (30L in FIG. 23) corresponding to the fifth target stroke position value (TSP5 in FIG. 28) that is set to correspond to the fifth state during the turning posture pre-posture period, may be configured to transmit a third control command to the actuator (30L in FIG. 23) such that the actuator (30L in FIG. 23) performs a right-turning posture control corresponding to a right-turning direction during the turning posture control period.

Meanwhile, the controller 106 of the vehicle control apparatus 100 according to the embodiment of the present invention may be implemented using an electronic control unit (ECU, not shown) or a micro control unit (MCU, not shown) for controlling, sensing, and determining the overall operation of the vehicle.

In addition, the implementation of the controller 106 is not limited thereto, and the controller 106 may include all types of control units, determination units, calculation units, and filtering units as long as it can control, determine, and calculate the overall operation of the vehicle and remove noise signals In addition, the sensor 102 may include a steering angle sensor (not shown) for sensing a steering angle value and a speed sensor (not shown) for sensing a vehicle speed value.

In addition, the sensor 102 may include a lateral acceleration sensor (not shown) for sensing a lateral acceleration value.

In addition, the controller 106 may calculate a lateral acceleration value generated during turning of the vehicle on the basis of the sensed steering angle value and the sensed vehicle speed value, rather than receiving the lateral acceleration value sensed by the lateral acceleration sensor (not shown).

In this case, the lateral acceleration value may be calculated by the following equation.

$$A_{y_{est}} = \frac{V_S^2}{R} = \frac{\theta_{SW} \times V_S^2}{n \times L} \left( R = \frac{L}{\theta}, \theta = \frac{\theta_{SW}}{n} \right) \qquad <\text{Equation}>$$

In this case, $A_{y_{est}}$ denotes a sensed lateral acceleration value, $V_S$ denotes a vehicle speed value, R denotes a turning radius value, $\theta_{SW}$ denotes a steering angle value, n denotes a steering gear ratio value, L denotes a wheel base value, and $\theta$ denotes a tire angle value.

The sensor 102 may include a motor position sensor (not shown) included in the actuator 30L for sensing the position of a stroke node of the left upper arm 20L and the right upper arm 20R.

As such, the vehicle control apparatus 100 and the vehicle control method 1800 according to the embodiment of the present invention may miniaturize the actuator 30L that adjusts the camber angle of the wheels 2L and 2R while improving the performance of adjusting the camber angle at a lower power consumption.

In addition, the vehicle control apparatus 100 and the vehicle control method 2900 according to the embodiment of the present invention may allow a stroke position value CSP1, CSP2, CSP3 or CSP4 of the active camber device 104 to be shifted to a target stroke position value TSP1, TSP2, TSP3, TSP4, or TSP5 that is set to correspond to a speed range of the vehicle and a degree of steering intention of the driver during a turning posture pre-control period in advance, to reduce a turning posture control time in which the active camber device 104 performs a turning posture control corresponding a turning direction during a turning posture control period.

Accordingly, when the vehicle control apparatus 100 and the vehicle control method 2900 according to the embodiment of the present invention may provide optimum steering feeling and ride comfort while improving the turning stability of the vehicle when performing a turning posture control corresponding to a turning direction during a turning posture control period.

In addition, the vehicle control apparatus 100 and the vehicle control method 2900 according to the embodiment of the present invention may reduce the side slip angle of the vehicle, and thus prevent the tire from being worn out.

As is apparent from the above, the vehicle control apparatus and the vehicle control method can improve the performance of adjusting the camber angle at a low power consumption while reducing the size of the actuator for adjusting the camber angle of the wheel.

The vehicle control apparatus and the vehicle control method can provide an optimal steering feeling and ride comfort while improving the turning stability of the vehicle.

The vehicle control apparatus and the vehicle control method can prevent a tire from being worn out.

What is claimed is:
1. A vehicle control apparatus comprising:
a sensor configured to sense at least one of a vehicle speed value and a lateral acceleration value of a vehicle;
an active camber device including a knuckle for supporting a wheel of the vehicle, an upper arm having one end rotatably connected to the knuckle to form a stroke node, and an, actuator for rotationally shifting the stroke node of the upper arm with respect to a connection point with the knuckle in a vertical direction which is an upward or downward direction with respect to the vehicle; and a controller configured to vary a position of the stoke node of the upper arm in the vertical direction which is the upward or downward direction with respect to the vehicle through the actuator on the basis of one of the sensed vehicle speed value and the sensed lateral acceleration value.

2. The vehicle control apparatus of claim 1, wherein the controller includes a manual mode in which the position of the stroke node of the upper arm is adjusted according to a command of a driver or an automatic mode in which the position of the stroke node of the upper arm is automatically adjusted according a steering intention of the driver.

3. The vehicle control apparatus of claim 2, wherein the shift of the stroke node of the upper arm between a plurality of predetermined stroke node positions is discontinuously performed in the manual mode, and is continuously performed in the automatic mode.

4. The vehicle control apparatus of claim 1, wherein the controller determines a stroke node position to which the upper arm is to be shifted, on the basis of the one of the sensed vehicle speed value and the sensed lateral acceleration value.

5. The vehicle control apparatus of claim 4, wherein the controller shifts the stroke node of the upper arm to be closer to a maximum position as the one of the sensed vehicle speed value and the sensed lateral acceleration value increases.

6. The vehicle control apparatus of claim 1, wherein the controller shifts a stroke node of an upper arm positioned on an outer wheel bumped at a time of turning such that a negative camber angle of the outer wheel is increased while shifting a stroke node of an upper arm positioned on an inner wheel rebounded at a time of turning such that a positive camber angle of the inner wheel is increased.

7. The vehicle control apparatus of claim 1, wherein the controller is further configured to:
determine a status of a steering intention of a driver using the sensed vehicle speed value and the sensed lateral acceleration value; and
upon determining that the status of the steering intention of the driver, transmit a drive command to the active camber device such that a stroke position value of the active camber device is shifted to a target stroke position value that is set to correspond to a speed range of the vehicle and a degree of the steering intention of the driver during a turning posture pre-control period in advance, to reduce a turning posture control time in which the active camber device performs a turning posture control corresponding to a turning direction during a turning posture control period.

8. The vehicle control apparatus of claim 7, wherein the controller is configured to:
in response to determining a current state to be a first state in which the vehicle is stopped or travels straight in a low speed range using the sensed vehicle speed value, transmit a first drive command to the active camber device such that the stroke position value of the active camber device is shifted to a first target stroke position value that is set to correspond to the first state during the turning posture pre-control period in advance;
in response to determining the current state to be a second state in which the steering intention of the driver is low using the sensed lateral acceleration value, transmit a second drive command to the active camber device such that the stroke position value of the active camber device is shifted to a second target stroke position value that is set to correspond to the second state during the turning posture pre-control period in advance;
in response to determining the current state to a third state in which the vehicle travels straight in a high speed range using the sensed vehicle speed value and the sensed lateral acceleration value, transmit a third drive command to the active camber device such that the stroke position value of the active camber device is shifted to a third target stroke position value that is set to correspond to the third state during the turning posture pre-control period in advance;
in response to determining the current state to be a fourth state in which the vehicle travels straight in an intermediate speed range using the sensed vehicle speed value and the sensed lateral acceleration value, transmit a fourth drive command to the active camber device such that the stroke position value of the active camber device is shifted to a fourth target stroke position value that is set to correspond to the fourth state during the turning posture pre-control period in advance; and
in response to determining the current state to be a fifth state in which the vehicle travels straight in a low speed range using the sensed vehicle speed value and the sensed lateral acceleration value, transmit a fifth drive command to the active camber device such that the stroke position value of the active camber device is shifted to a fifth target stroke position value that is set to correspond to the fifth state during the turning posture pre-control period in advance.

9. The vehicle control apparatus of claim 7, wherein the controller is further configured to:
determine whether the stroke position value is shifted to the corresponding target stroke position value; and
in response to determining that the stroke position value is shifted to the corresponding target stroke position value, transmit a control command to the active camber device such that the active camber device performs a turning posture control corresponding to a turning direction during the turning posture control period.

10. The vehicle control apparatus of claim 9, wherein the controller is configured to:
in response to determining that the stroke position value is shifted to the third target stroke position value that is set to correspond to the third state in which the vehicle travels straight in the high speed range, transmit a first control command to the active camber device such that the active camber device performs a turning posture control corresponding to a turning direction during the turning posture control period;
in response to determining that the stroke position value is shifted to the fourth target stroke position value that is set to correspond to the fourth state in which in which the vehicle travels straight in the intermediate speed range, transmit a second control command to the active camber device such that the active camber device performs a turning posture control corresponding to a turning direction during the turning posture control period; and
in response to determining that the stroke position value is shifted to the fifth target stroke position value that is set to correspond to the fifth state in which the vehicle travels straight in the low speed range, transmit a third control command to the active camber device such that the active camber device performs a turning posture control corresponding to a turning direction during the turning posture control period.

11. A vehicle control method comprising:
sensing at least one of a vehicle speed value and a lateral acceleration value of a vehicle; and
varying a position of a stoke node of an upper arm in a vertical direction which is an upward or downward direction with respect to the vehicle through an actuator of an active camber device on the basis of one of the sensed vehicle speed value and the sensed lateral acceleration value.

12. The vehicle control method of claim 11, further comprising performing a manual mode in which the position of the stroke node of the upper arm is adjusted according to a command of a driver, or an automatic mode in which the position of the stroke node of the upper arm is automatically adjusted according a steering intention of the driver.

13. The vehicle control method of claim 11, further comprising determining a stroke node position to which the upper arm is to be shifted, on the basis of the one of the sensed vehicle speed value and the sensed lateral acceleration value.

14. The vehicle control method of claim 13, further comprising shifting the stroke node of the upper arm to be closer to a maximum position as the one of the sensed vehicle speed value and the sensed lateral acceleration value increases.

15. The vehicle control method of claim 11, further comprising shifting a stroke node of an upper arm positioned on an outer wheel bumped at a time of turning such that a negative camber angle of the outer wheel is increased while shifting a stroke node of an upper arm positioned on an inner wheel rebounded at a time of turning such that a positive camber angle of the inner wheel is increased.

16. The vehicle control method of claim 11, further comprising:
determining a status of a steering intention of a driver using the sensed vehicle speed value and the sensed lateral acceleration value; and
upon determining that the status of the steering intention of the driver, transmitting a drive command to the active chamber device such that a stroke position value of the active camber device is shifted to a target stroke position value that is set to correspond to a speed range of the vehicle and a degree of the steering intention of the driver during a turning posture pre-control period in advance; to reduce a turning posture control time in which the active camber device performs a turning posture control corresponding to a turning direction during a turning posture control period.

17. The vehicle control method of claim 16, further comprising:
in response to determining a current state to be a first state in which the vehicle is stopped or travels straight in a low speed range using the sensed vehicle speed value, transmitting a first drive command to the active camber device such that the stroke position value of the active camber device is shifted to a first target stroke position value that is set to correspond to the first state during the turning posture pre-control period in advance;
in response to determining the current state to be a second state in which the steering intention of the driver is low using the sensed lateral acceleration value, transmitting a second drive command to the active camber device such that the stroke position value of the active camber device is shifted to a second target stroke position value that is set to correspond to the second state during the turning posture pre-control period in advance;
in response to determining the current state to a third state in which the vehicle travels straight in a high speed range using the sensed vehicle speed value and the sensed lateral acceleration value, transmitting a third drive command to the active camber device such that the stroke position value of the active camber device is shifted to a third target stroke position value that is set to correspond to the third state during the turning posture pre-control period in advance;
in response to determining the current state to be a fourth state in which the vehicle travels straight in an intermediate speed range using the sensed vehicle speed value and the sensed lateral acceleration value, transmitting a fourth drive command to the active camber device such that the stroke position value of the active camber device is shifted to a fourth target stroke position value that is set to correspond to the fourth state during the turning posture pre-control period in advance; and
in response to determining the current state to be a fifth state in which the vehicle travels straight in a low speed range using the sensed vehicle speed value and the sensed lateral acceleration value, transmitting a fifth drive command to the active camber device such that the stroke position value of the active camber device is shifted to a fifth target stroke position value that is set to correspond to the fifth state during the turning posture pre-control period in advance.

18. The vehicle control method of claim 16, further comprising:
determining, whether the stroke position value is shifted to the corresponding target stroke position value; and
in response to determining that the stroke position value is shifted to the corresponding target stroke position value, transmitting a control command to the active camber device such that the active camber device performs a turning posture control corresponding to a turning direction during the turning posture control period.

19. The vehicle control method of claim 18, further comprising:
in response to determining that the stroke position value is shifted to the third target stroke position value that is set to correspond to the third state in which the vehicle travels straight in the high speed range, transmitting a first control command to the active camber device such that the active camber device performs a turning posture control corresponding to a turning direction during the turning posture control period;
in response to determining that the stroke position value is shifted to the fourth target stroke position value that is set to correspond to the fourth state in which in which the vehicle travels straight in the intermediate speed range, transmitting a second control command to the active camber device such that the active camber device performs a turning posture control corresponding to a turning direction dung the turning posture control period; and in response to determining that the stroke position value is shifted to the fifth target stroke position value that is set to correspond to the fifth state in which the vehicle travels straight in the low speed range, transmitting a third control command to the active camber device such that the active camber device performs a turning posture control corresponding to a turning direction during the turning posture control period.

* * * * *